(12) United States Patent
Venkatesan et al.

(10) Patent No.: US 7,480,802 B2
(45) Date of Patent: *Jan. 20, 2009

(54) LICENSE-BASED CRYPTOGRAPHIC TECHNIQUE, PARTICULARLY SUITED FOR USE IN A DIGITAL RIGHTS MANAGEMENT SYSTEM, FOR CONTROLLING ACCESS AND USE OF BORE RESISTANT SOFTWARE OBJECTS IN A CLIENT COMPUTER

(75) Inventors: Ramarathnam Venkatesan, Redmond, WA (US); Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 221 days.

This patent is subject to a terminal disclaimer.

(21) Appl. No.: 11/276,749

(22) Filed: Mar. 13, 2006

(65) Prior Publication Data

US 2007/0061580 A1      Mar. 15, 2007

Related U.S. Application Data

(63) Continuation of application No. 09/315,734, filed on May 20, 1999, now Pat. No. 6,898,706.

(51) Int. Cl.
*H04L 9/00* (2006.01)
(52) U.S. Cl. ...................................................... 713/176
(58) Field of Classification Search ................. 713/167, 713/176
See application file for complete search history.

(56) References Cited

U.S. PATENT DOCUMENTS

| | | | |
|---|---|---|---|
| 5,379,345 | A | 1/1995 | Greenberg |
| 5,745,569 | A | 4/1998 | Moskowitz et al. |
| 5,903,882 | A | 5/1999 | Asay et al. |
| 6,510,513 | B1 | 1/2003 | Danieli |

*Primary Examiner*—Jacob Lipman
(74) *Attorney, Agent, or Firm*—Lee & Hayes, PLLC

(57) ABSTRACT

A technique for imparting substantial break-once-run-everywhere (BORE) resistance to passive and active software objects, and for controlling access and use of resulting protected objects by a client computer (400). Specifically, a relatively large number, n, of identical watermarks (1720) are embedded throughout a software object (1700), through use of n different secret watermark keys to form a protected object, with each key defining a pointer to a location in the protected object at which a corresponding watermark appears.

12 Claims, 16 Drawing Sheets

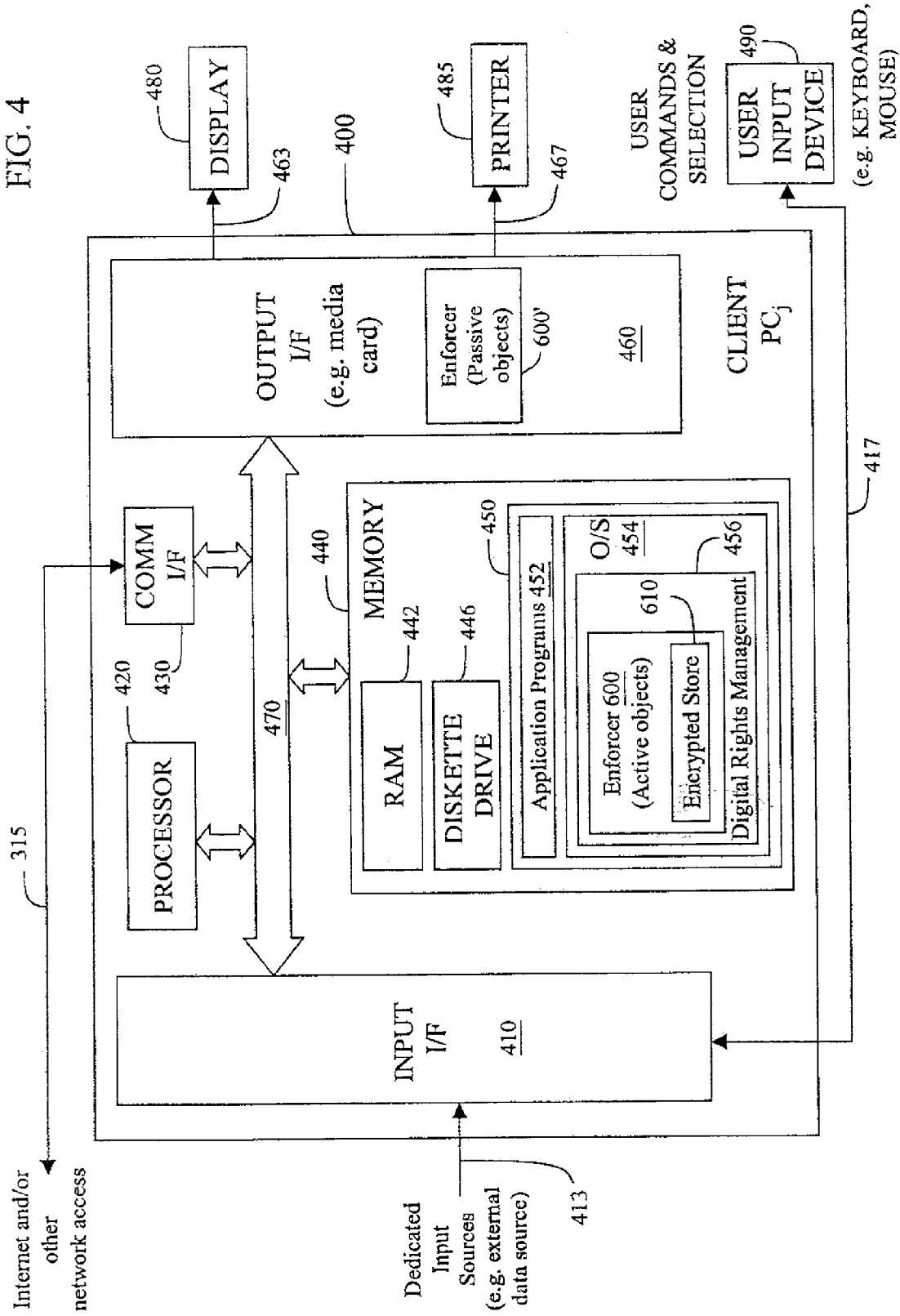

FIG. 15 -- CLIENT WATERMARK KEY ASSIGNMENT PROCESS            1500
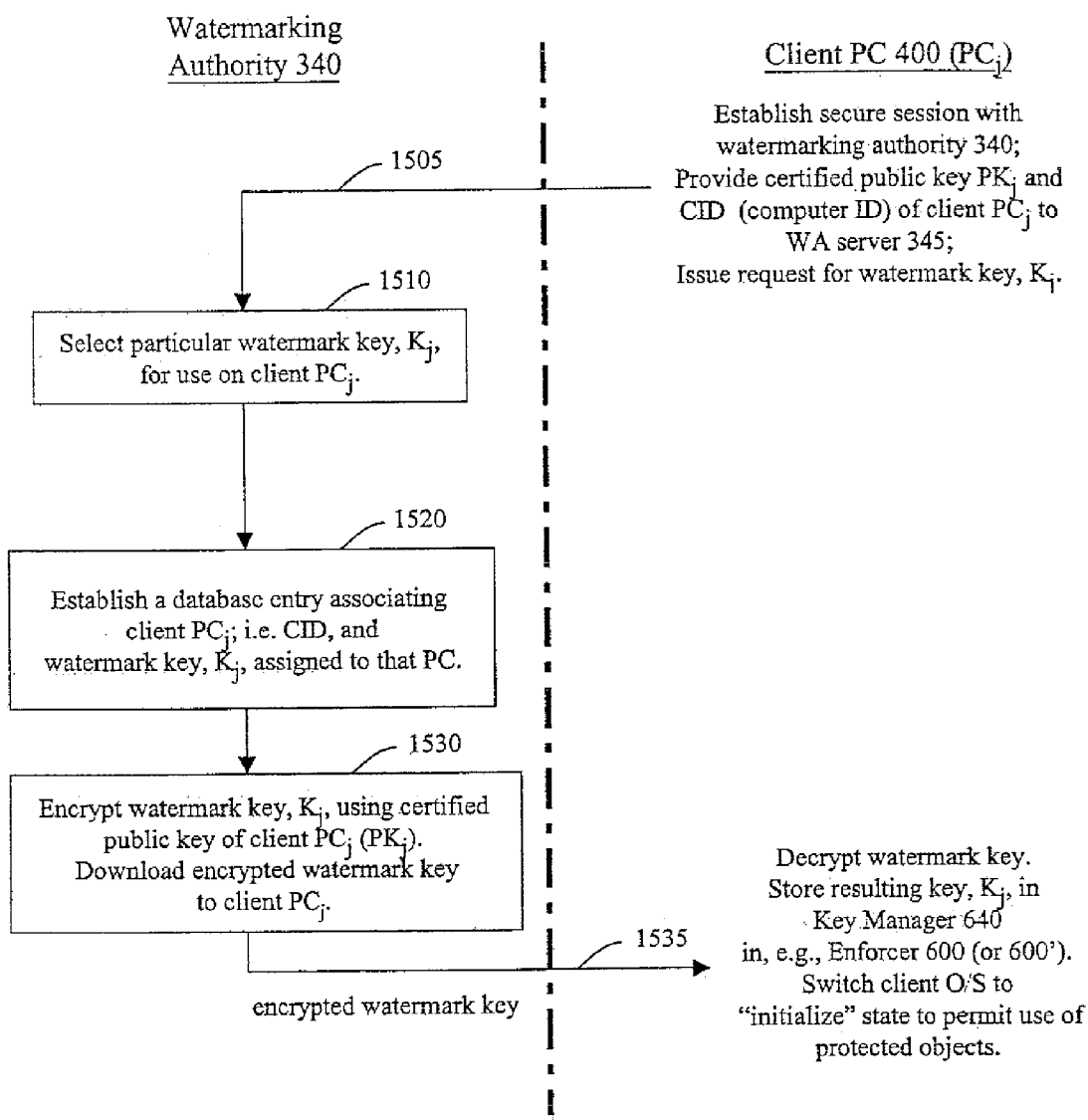

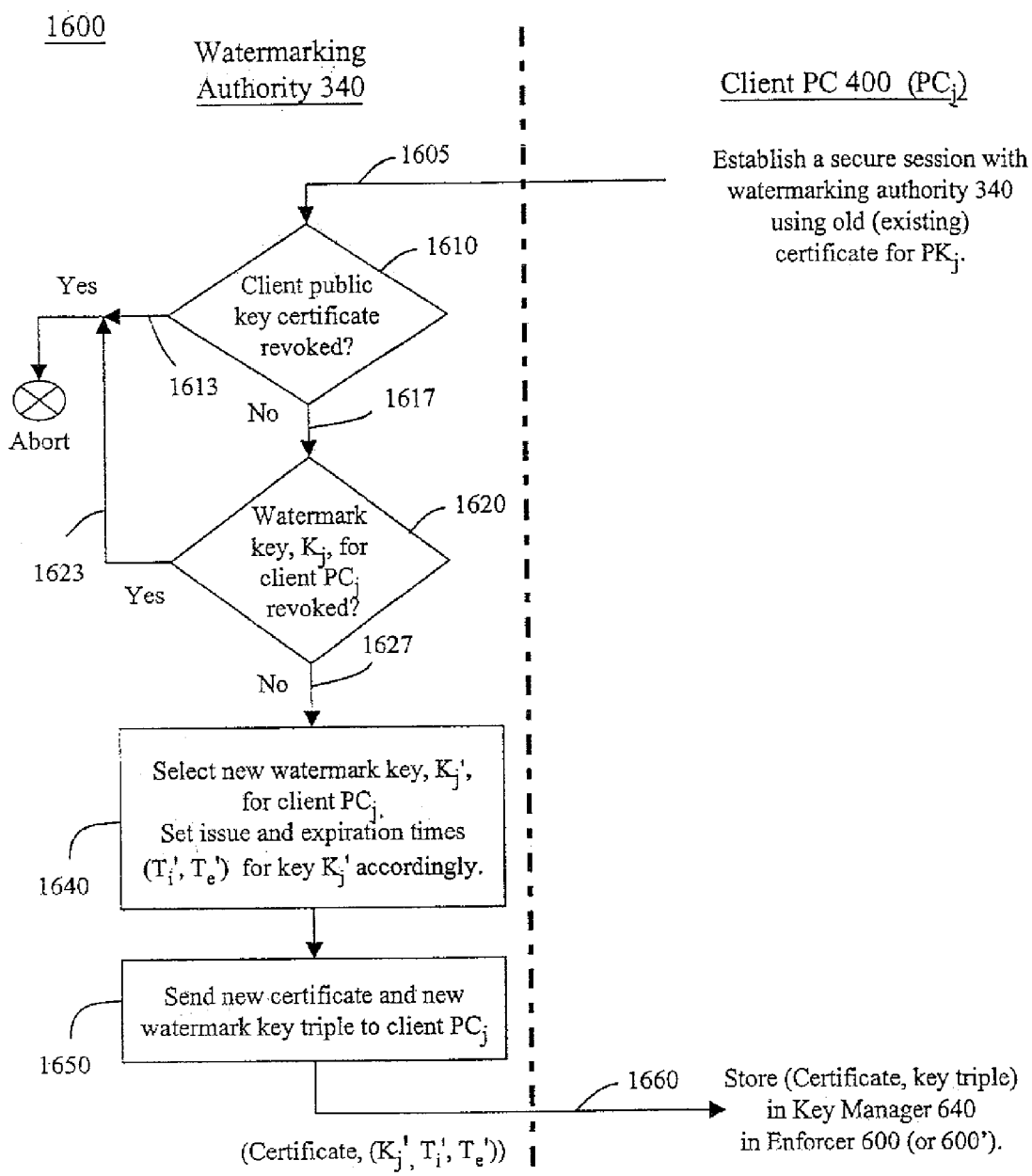
FIG. 16 -- NEW WATERMARK KEY PROVISIONING PROCESS

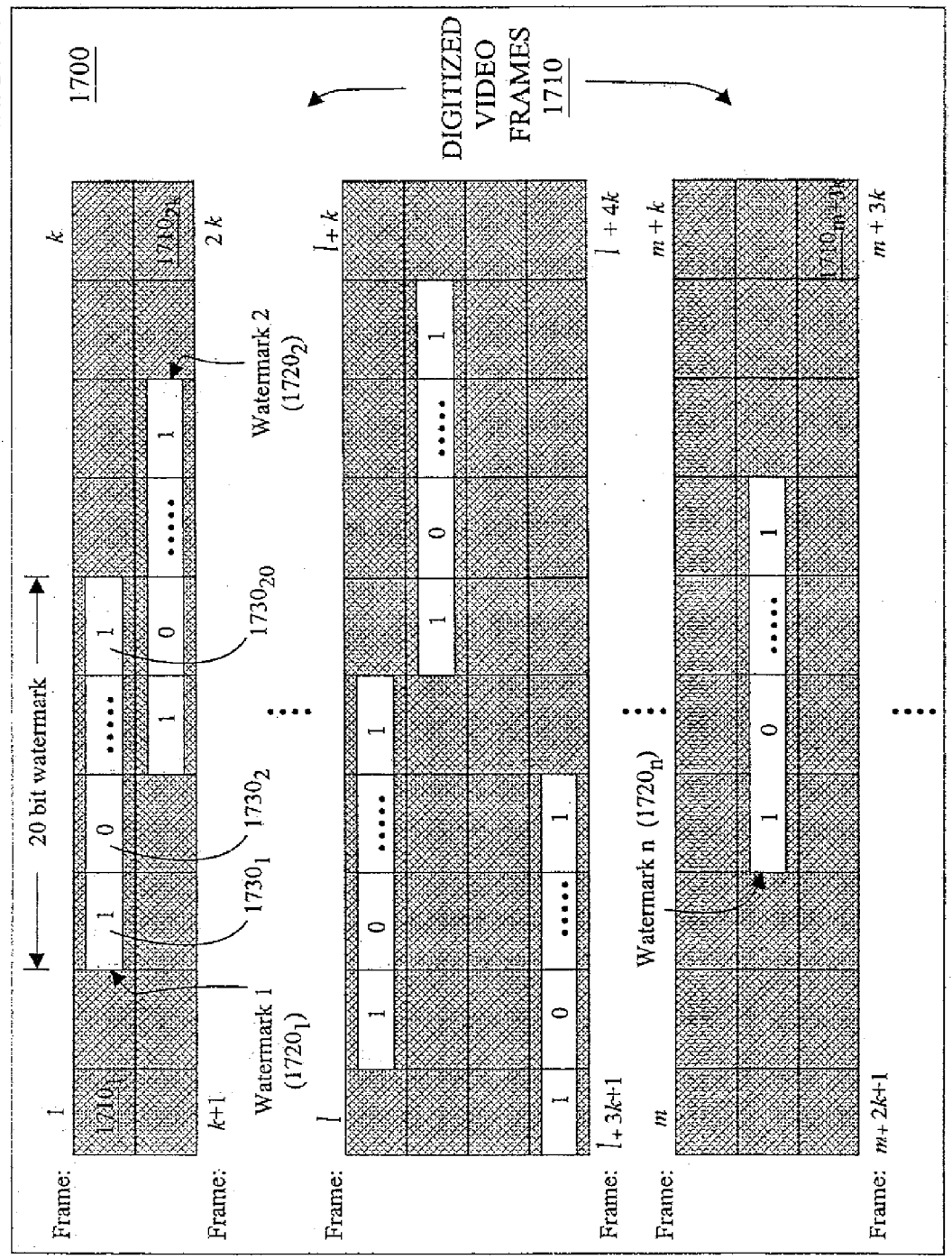

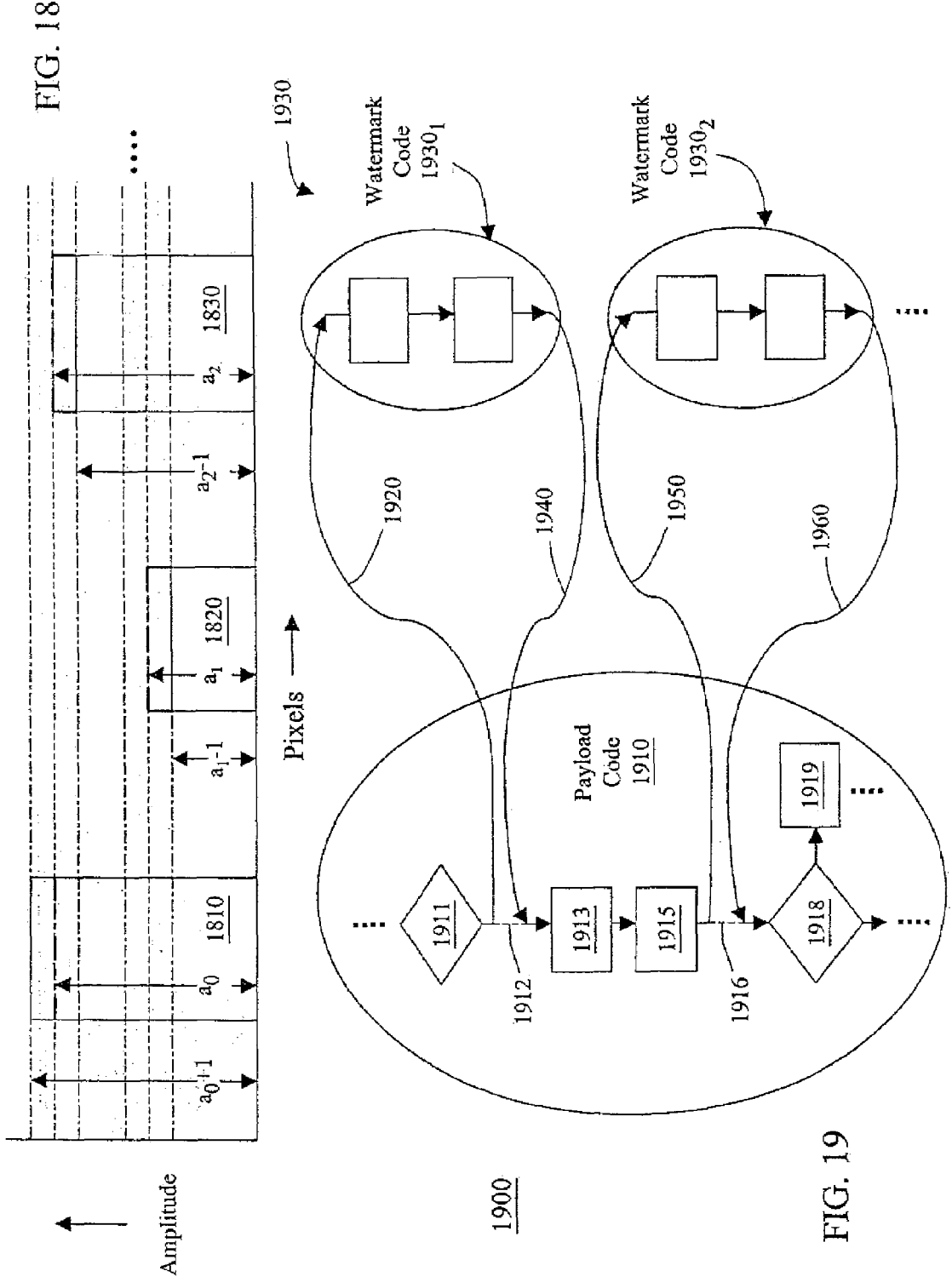

LICENSE-BASED CRYPTOGRAPHIC TECHNIQUE, PARTICULARLY SUITED FOR USE IN A DIGITAL RIGHTS MANAGEMENT SYSTEM, FOR CONTROLLING ACCESS AND USE OF BORE RESISTANT SOFTWARE OBJECTS IN A CLIENT COMPUTER

CROSS REFERENCE TO RELATED PATENT APPLICATION

This is a continuation of and priority is claimed to co-pending U.S. patent application having Ser. No. 09/315,734 and a filing date of May 20, 1999 for A LICENSE-BASED CRYPTOGRAPHIC TECHNIQUE, PARTICULARLY SUITED FOR USE IN A DIGITAL RIGHTS MANAGEMENT SYSTEM, FOR CONTROLLING ACCESS AND USE OF BORE RESISTANT SOFTWARE OBJECTS IN A CLIENT COMPUTER to Venkatesan, et al. This co-pending United States Patent Application is commonly assigned herewith and is hereby incorporated herein by reference for all that it discloses.

BACKGROUND OF THE DISCLOSURE

1. Field of the Invention

The invention relates to cryptography, particularly a technique including both apparatus and an accompanying method, for imparting to passive and active software objects, such as correspondingly content and executable code, a substantial degree of protection against break-once-run-everywhere (BORE) attacks and for restricting access and use of resulting protected objects that have been, e.g., downloaded, via a networked connection, to a client computer. Such a technique is particularly~ though not exclusively, suited for use in a digital rights management (DRM) system executing in the client computer.

2. Description of the Prior Art

Content, such as video and audio recordings, and other multi-media presentations, is increasingly being provided to consumers in digital form. Digital recordings provide enhanced clarity, attributable in part to a substantially diminished noise level, over that commonly provided by conventional analog media. Facilitating this trend is an increasing availability, from a wide range of manufacturers, of relatively economical consumer-oriented digital recording and playback equipment, such as, for example, those employing compact disc (CD) and digital audio tape (DAT) formats.

Unfortunately, the very characteristics of digital content that make it quite attractive to consumers also significantly foster its illicit duplication, i.e., piracy. In that regard, by virtue of digitized data which embodies content on a legitimate copy, whether that data constitutes, e,g., a sound recording, a video recording or a photograph, each subsequent copy of that data will, for all practical purposes, exactly match the original content; thus, providing the same fidelity as the legitimate copy. Hence, a pirate, having access to a legitimate copy, could, rather readily, massively produce illicit copies that, at least from a standpoint of its content, might not be distinguishable from its legitimate copy. Obviously, the ease with which such high quality illicit copies could be generated has caused substantial alarm among content providers, particularly given a substantial loss of revenues that could result from lost sales attributable to widespread piracy.

One of the oldest and usually least effective techniques used to deter illicit copying is simply to append a copyright and other legal proprietary rights notices to an object as distributed on mass (magnetic or optical) media. The intention in doing so is to place a third party on notice that a copy of that object, as embodied in the media, is legally protected and that its publisher may take legal action to enforce its rights in the object against that party to prevent illicit copying. While these notices are often necessary in many jurisdictions to secure full legal remedies against illicit copying, in practice, these notices have provided little, if any, real protection against third party copying. In that regard, in those countries with relatively lax enforcement of intellectual property rights, sales lost to illicit copying of an object, such as a popular movie or audio recording, often significantly dwarf legitimate sales of the same object.

As such, these providers, typified by, e.g., movie studios and music publishers, have turned to technical rather than just legal approaches to deter illicit copying.

In that regard, these providers have recently persuaded hardware manufacturers, of consumer electronic audio and video recording devices, to incorporate appropriate copy-protect circuitry into their products, such as DAT recorders, to actively limit an amount through which content stored on digital media, such as a DAT, containing a legitimately purchased copy, can itself be copied further. In that regard, data encoded on the legitimate copy is read by the copy-protect circuitry in a DAT recorder and used to essentially inhibit that recorder from making more than one copy of that content onto another DAT.

Widespread use of the Internet is a rather recent development that is also significantly fueling the expanding use of digital content. Given the availability of relatively inexpensive but rather sophisticated personal computers with attendant web browsers and multi-media players and the widespread global proliferation of inexpensive consumer Internet connections, the Internet is emerging as an excellent vehicle through which content publishers can cost-effectively distribute content to large numbers of customers—regardless of where these customers are located. This content can range from audio or video clips, to recorded songs to entire movies. Software in the form of application programs, is increasingly being distributed through the Internet to the consuming public. However, the number of consumers that purchase software in this manner is currently rather small, though rapidly growing, compared to those that obtain physically packaged software through a more conventional distribution channel.

PCs, being general purpose in nature, do not contain copy-protect circuitry of the type used with, e.g., DAT recorders. Hence, conventional hardware-centric anti-piracy measures, such as those used with DAT and other consumer recording devices, are simply ineffective to preclude illicit copying of digital content distributed over the Internet. Thus, content providers are once again faced with a possible attendant loss of substantial revenues, though through a different distributional vehicle, due to illicit copying.

Hence, extensive effort is currently underway in the art and aimed at developing a so called "digital rights management" (DRM) initiative to counter expected piracy of Internet accessible content.

Underlying this initiative is a basic concept, akin to that in copyright, of bifurcating ownership of those bits themselves, that constitute a content object, from rights to use these bits. This use can encompass, e.g., rendering that object, in the case of passive content, or executing that object in the case of an active object containing executable code. As presently envisioned in the art, the DRM initiative would permit any individual to freely and at no cost access and download, through his(her) client PC, a file containing a desired object from a web site associated with a corresponding publisher. Once downloaded, ownership of the content bits themselves would pass to the individual, i.e., an "owner". However, the rights to use the object contained in the file would remain with the publisher of the object and be licensed to the owner of the bits based on a license fee paid to the publisher by that owner. By remitting a certain fee, typically through an Internet transaction, the owner would be provided with a software license which delineates the rights to which that owner can then use these bits. For example, in the case of a downloaded song, for a relatively modest fee, the license may permit the owner to play the object, here content for the song, just once. For a larger fee, the license may permit the owner to play that song a certain number of times or freely play the song during a certain time period, such as a week or month. For an even larger fee, the license may be configured to permit the owner to play the song on an unlimited basis, i.e., as much as (s)he wants and whenever (s)he wants.

In particular, the downloaded file would contain a software "lock" of some sort which inhibits the client PC from suitably handling an object contained in that file, such as, in the case of a video clip, locally rendering the object on a computer display. period, such as a week or month. For an even larger fee, the license may be configured to permit the owner to play the song on an unlimited basis, i.e., as much as (s)he wants and whenever (s)he wants.

Once the owner downloads a desired file, then, through a separate transaction conducted with a publisher of the object contained in that file, such as a music publisher, (s)he would receive and locally store a software certificate from the publisher. The certificate would contain the software implemented license as well as a suitable secret value ("secret") as noted above, the license would specify, in view of the license fee paid by the owner a degree of access (license grant) to which that owner is given to the object. When the owner desires to subsequently access and use the content, appropriate software, e.g., a DRM process, executing in the client PC would first obtain the certificate from local storage; ascertain, from conditions of the license grant set forth in the certificate, whether the desired access and use is allowed; and then, if so, use the secret to unlock the object, and finally permit the object to be subsequently handled, such as played in the case of a passive audio clip, as desired by the user and in accordance with the license grant. Any object that did not contain an appropriate software "lock" would be unaffected by a DRM process; that process would essentially ignore that object and hence not restrict its subsequent use.

While widespread adoption of the DRM initiative, as least as broadly envisioned, is expected to appreciably restrain illicit copying of Internet distributed software objects, underlying this initiative is the development and use of a practical and effective locking mechanism, particularly one employing cryptographic encryption, for use with such objects. Thus far, the art fails to teach such a mechanism.

Traditionally, cryptographic measures have involved encrypting a plaintext object—whether it be a message or a document, in some fashion, into a ciphertext object through a cryptographic algorithm, i.e., a so-called "cipher", that relies on a secret value (henceforth just a "secret"). Depending on the specific cipher used, this secret can be, e.g., a simple key known only to a sender and a recipient, or can be a private key of a public/private key pair. Upon receipt of the ciphertext object, each such individual would then convert the ciphertext object, through a process, inverse to that of the ciphers using his(her) secret, to yield the plaintext object.

While these traditional cryptographic measures, depending on the particular cipher used, can be extremely secure against third-party cipher attacks, they are ill-suited for use for distributing objects, such as content files, to massive numbers of recipients, particularly to individual PCs.

In that regard, sophisticated cryptographic ciphers, such as those using, e.g., so-called RSA (Rivest-Shamir-Adelman) or Diffie-Hiellman type ciphers, exist for decrypting ciphertext. Though these ciphers are extremely secure, because of their nature, they are not suited for use in encrypting large objects, i.e., performing bulk encryption. Furthermore and importantly, if an object were to be protected through, use of appending a digital signature to that object, even a signature computed using, e.g., RSA, a pirate could easily remove that signature from the file containing the object and thereby gain unfettered access to an underlying unprotected object.

Therefore, faced with these deficiencies, the art, in the context of digital rights management, appears to be considering the use of watermarking. In essence, a watermark is an identifier that, in the context of a software object, would be tightly integrated into that object but would not be discernible to a third party. Furthermore, that party will likely experience considerably more difficulty in removing a correctly implemented watermark from a software object than removing a digital signature.

When the object is accessed, a cryptographic process, using a secret provided in a DRM certificate, would reveal the presence of the watermark embedded in the object and then detect its value. The secret would define an approximate location (e.g. in the time and frequency domain) at which the watermark can be found.

If the correct watermark were then detected, i.e., an identical match then existed between the watermark embedded in the object and its expected value provided in the license, the DRM process would then ~unlock" that object.

Disadvantageously, this approach relies on embedding a single watermark into an object. If a pirate were to discover the watermark—even in view of its difficulty of detection, thus breaking the "lock", the pirate could then excise the watermark from the object, and illicitly copy the object and massively distribute resulting illicit copies free and clear of any restriction on their use otherwise imposed through digital rights management, Any recipient of such an illicit copy of the object could, in turn, make copies of that object and further distribute those copies free and clear of its prior software "lock", and so forth with subsequent recipients. Thus, the watermarked object could be susceptible to what we refer to as a "break-once-run-everywhere" (BORE) attack. Through such a successful attack, once the pirate uncovers the single cryptographic parameter, in this case a watermark, protecting the object, (s)he then possesses the unprotected object at which point the publisher has effectively ceded significant control over consumer access and use of that object to the pirate. Hence, protection that a content publisher would otherwise gain through use of digital rights management, at least with respect to the illicit copies, would be completely lost.

However, given enough resources, particularly processing capacity, money and time, a pirate could break the watermark, thus nullifying protection afforded by digital rights management. If sufficient demand exists in the marketplace for a given object—which is particularly true for a popular feature length movie, then the pirate may well have adequate economic motivation to incur the investment in time, cost and effort needed to break the watermark. In that regard, the pirate will likely incur the investment if the resulting gains to be had through illicit copying sufficiently outweigh all the associated costs of time, effort and money needed to break the watermark and make and distribute the illicit copies.

BORE attacks, against watermarked objects, are not limited to pirates but can also arise from third-party "hackers", i.e., individuals who are often not motivated by monetary gain but do possess sufficient expertise and computing resources to break cryptographic protection and post, on the Internet, a resulting unprotected object for widespread distribution.

Nevertheless, the DRM initiative holds significant promise as a mechanism that will sufficiently restrict illicit copying of Internet accessible software objects and hopefully, by doing so, assure a sufficient financial return to publishers of those objects for their legitimate consumer access and use. Moreover, DRM, if adopted, should facilitate increased use of the Internet as a cost-effective mechanism for distributing software objects to a large universe of consumers.

However, for DRM to be effective against attempted piracy, a serious need exists in the art for an adequate software "lock" that can be utilized with software objects. The lock must be sufficiently resistant to BORE attacks such that substantial costs would be incurred by any third-party, particularly a pirate, who attempts to break the lock—costs that are sufficiently high as to outweigh any likely financial gain to be had from illicit copying. Moreover, the "lock" should be sufficiently difficult to detect and sufficiently robust to withstand attack from ~hackers". Furthermore, the ~lock" should be practical, particularly when used with large software objects, and not require a separate secret for each different recipient.

SUMMARY OF THE INVENTION

Our present invention advantageously satisfies this need and overcomes the deficiencies in the art through creation of our inventive "BORE" resistant object and our inventive use of that object as part of a digital rights management system in a client computer, such as a client personal computer (PC).

In essence and in accordance with our inventive teachings, a BORE resistant object is created by embedding a relatively large number, n, of identical watermarks throughout a single software object, through use of n different secret watermark keys. Each of these watermark keys defines a starting location (e.g., in time, space or frequency) in a protected object (or, in a general sense, a pointer to a location in that object) at which a corresponding watermark appears. Once a user has downloaded the protected object through a client computer, the user then transacts with publisher's web server to obtain an electronic license, cryptographically signed by the publisher to an "enforcer" located in that computer, which specifies access rights, which the publisher accords to this client computer, and the watermark value. The client computer contains an enforcer equipped with only one of the n watermark keys. Whenever the client computer attempts to access a file containing a protected object, the enforcer examines the object using its secret watermark key. If the object contains a watermark appearing at a location specified by the enforcer's watermark key, a client operating system accesses a license database to determine whether a signed license made to the enforcer and linked, via the publisher's cryptographic signature, to this protected object resides in that database. A value of a parameter in the license must match a value of the same parameter contained in a watermark detected in the object. In that regard, the license must be signed by the publisher specified in the watermark and made to a product identification (PID) value that appears in the watermark.

Thus, the watermark effectively becomes "glue" between the protected object and its license. If no such license exists, the enforcer inhibits any further access to the object. Otherwise, the enforcer determines whether the watermark value contained in the license matches that detected in the object, and, if so, permits access to the object in accordance with the rights specified in the license. The object can be either an active (executable) or a passive (content) software object.

In particular, the publisher of a given object not only sets the value of the watermark itself . . . typically to a concatenation of a vendor (publisher) identification (VID) value and the PID) value.—but also provides that value to a third-party watermarking authority {WA), along with an unwatermarked copy of that object (0). The WA then embeds the watermark n times, each beginning in a starting location determined by a corresponding different one of the secret keys, throughout the object in order to yield the watermarked object (0). All n watermark keys are generated by the WA and are identical across all objects that are to be protected, regardless of their corresponding publishers. These keys are generated once and will be universally used for a relatively long, but finite period, for all objects, from whatever publisher or source, that are to be protected.

Once the WA watermarks a particular object (0), it then provides a resulting watermarked version of that object (0WM) back to its publisher. The publisher, in turn, replicates the watermarked object as often as needed, and, if desired, serializes each resulting copy, by embedding a single so-called "fingerprint" value in each resulting copy. The fingerprint only occurs once in any copy with its value being unique to that copy. Once a copy has been fingerprinted (to yield object $O_f^{WM}$), the publisher then encrypts the fingerprinted, watermarked copy typically using a symmetric encryption cryptosystem. The publisher then distributes resulting encrypted, fingerprinted and watermarked copies of the object ($O_{fe}^{WM}$) at no-cost to requesting users, specifically to a client PC operated by each such user.

After a user has downloaded a watermarked object, then, in order to use that object, the user, through his(her) client PC, electronically transacts, through the Internet, with publisher's web server. In return for payment of a specific licensing fee to the publisher, this web server downloads to the client PC an electronic license (L), cryptographically signed by the publisher to the enforcer located in that PC. The license contains a rights vector, which specifies particular access rights which the publisher accords to this client PC, the product identification value (PID) for the licensed object and a symmetric encryption key.

Each such client PC contains an enforcer as part of a DRM system. From a data perspective, the enforcer is sited within a critical processing path, in the client PC, for the object, and specifically in a path that is difficult to bypass. The location of the enforcer, i.e., within a client 0/S or a media card, depends on whether the object is passive or active. The enforcer is equipped with only one of the n secret watermark keys. This particular key will have been previously provided to the enforcer by the watermarking authority.

Whenever the client PC attempts to access a file containing a watermarked (protected) object then residing in that PC, the enforcer in that PC examines the object, using its secret watermark key, to determine whether that object is, in fact, watermarked. If the object is not watermarked, then the enforcer permits the client PC to freely access the object, as desired by the user. Alternatively, if the object contains a watermark starting in relative location given by the enforcer's watermark key, then the enforcer so notifies the client O/S executing in the client PC. The client O/S accesses a license database to determine whether a signed license made to the enforcer and linked, via the publisher's cryptographic signature, to this protected object then exists in that database. If no such license is found, the enforcer inhibits any further access to the object, thus precluding any further use of that object by the client O/S or media card, as appropriate. Alternatively, if such a license is found, the enforcer determines whether the rID and PID values supplied in a header associated with the object and contained in the license itself, respectively, match those detected in the watermark contained in the object. If both match, then the enforcer permits access to the object in accordance with the specific usage rights specified in the license.

Advantageously and as a feature of our invention, by watermarking software through our inventive BORE resistant manner, the resulting object becomes substantially more difficult for an adversary to successfully break.

In that regard, by embedding n different watermarks into a single object and not labeling each client PC as to the specific watermark key it contains, the adversary is required to break not just one client PC to obtain its own embedded watermark key but substantially more than n such PCs to obtain all their embedded watermark keys. As such, if an adversary is to obtain a sufficient number of these keys such that it can successfully defeat the BORE resistant protection with sufficiently high probability of success, i.e., to permit a BORE-resistant object to be used by a sufficiently large number of client PCs regardless of any license restrictions, that adversary will need to break a number of client PCs that exceeds the value of n by at least 1-2 orders of magnitude.

The sheer magnitude of the costs associated with successfully breaking a sufficient number of client PCs to completely frustrate BORE-resistant protection effectively precludes successful broad-based attacks on BORE-resistant DRM systems. Consequently, piratical acts are far more likely to occur on a far more limited basis, such as through gaining unauthorized access to a small number of watermark keys. In that regard, if an adversary were to break the protection afforded by only a single client PC and learn its embedded watermark key, then only 1/n of an installed base of client PCs, that can handle BORE-resistant objects, would be compromised.

Furthermore, as an advantageous feature of our invention, our inventive technique effectively contains these attacks and, over time, through periodic expiration of watermark keys and selective key replacement, significantly diminishes on-going effectiveness of such compromises.

Specifically, should a publisher learn that a particular object was being pirated, then by simply obtaining a copy of the pirated object, the publisher could readily detect the fingerprint i.n that object. By querying its user database, the publisher could learn the identity of the client PC that the pirate used, in some fashion, to commit piracy. The publisher could then instruct the WA to revoke the watermark (old) key used by the particular client PC. All client PCs sharing that key, with exception of the particular client PC used by the pirate, will get a new watermark key. For a relatively long period of time, old and new watermark keys will co-exist to enable other objects watermarked with the old key to be accessed and used. However, new objects will be watermarked with the new key. In addition, the particular client PC used by the pirate may be "hot-listed" to limit its rights to access and/or use protected objects.

Watermark keys routinely expire after a given interval of time, as determined by, e.g., the $WA_r$ elapses. When such a key expires, an internal key manager process executing in the enforcer requires the client PC to contact the WA to obtain a replacement watermark key.

As a feature of our invention, if a watermark key has been compromised by a third party, our invention reduces, if not, over time, halts, a rapidly expanding security breach of protected objects that would otherwise and conventionally occur when knowledge of their compromised key spreads throughout a large user community. Advantageously, our invention also accommodates existing need9 of "innocent" users who continue to access and use those protected objects that require this key. Our invention accomplishes this by phasing out, over time, use of the compromised key and limiting its applicability to only those existing objects that have already been protected with this key.

Specifically, in the event that an existing watermark key is compromised, then that key is not immediately revoked and removed from service. To accommodate such innocent users, a watermark key can be associated with issue and expiration times Ti and Te at which the key has been issued and will expire, respectively. Hence, a watermark key, K, can be issuedas a triple (K, Ti, Te) and to frustrate its tampering or detection, can be stored within a secure key manager in a client PC. Should existing watermark key K be compromised, then a new watermark key, K" (typically chosen at random from all n existing watermark keys), with its corresponding issue and expiration times, i.e. (K', Ti', Te') will be issued and distributed to all client PCs which have been using the compromised key. As such, each of these client PCs will have two watermark key triples; that for the existing key, K, and that for the new watermark key, K'. As indicated above, all watermarked objects will be watermarked with all n keys (including keys K and K').

A license can also have associated issue and expiration times, ti and te, respectively. For each protected object, the enforcer in the client PC must utilize both watermark keys K and K' (or, in general, all the watermark keys it has) in examining a protected object for a watermark. An object is assumed to be unprotected if the enforcer fails to find any watermarks in the object. Should the enforcer detect a watermark using either key K or K', then a proper license must exist to access this object. In order for a license to be "proper", not only must a license exist for this object but also the watermark key must expire after the license does and the license must have been issued after the watermark key was, i.e., Te>te and ti>Ti must both be satisfied. Even if a license exists but either relationship fails, then the license is not "proper"; hence, the enforcer denies access to this object. A watermarking authority can preclude client PCs from gaining access to any future protected objects by simply not issuing a new key to that client PC to replace a key that has expired or will expire (the latter being typified by a compromised key).

Through use of this feature, client PCs can continue to utilize their existing watermark keys (e.g. key K) to access previously distributed protected objects. However, over time, these keys will eventually expire and require replacement. We anticipate that although the growth of keys will monotonically increase, the rate of growth will be quite low, with a client PC obtaining a new watermark key triple after the watermark keys on the Order of n different client PCs have been compromised.

To properly exploit our present invention, client PCs will be designed such that until any such PC obtains a valid unexpired watermark key—whether as an initial watermark key for that PC or to replace an expired key, that PC will be unable to process any object that has been protected through our inventive technique. Hence, if a publisher suspects that a particular client PC has been used for illicit purposes, then a watermark authority can simply revoke the existing watermark key for that particular client PC, thus precluding that PC from accessing any existing protected object.

BRIEF DESCRIPTION OF THE DRAWINGS

The teachings of the present invention can be readily understood by considering the following detailed description in conjunction with the accompanying drawings, in which:

FIG. 4 depicts a high-level block diagram of illustrative client personal computer (PC) 400, e.g., PCj, shown in FIG. 3;

FIG. 15 depicts a flowchart of client watermark key assignment process 1500 as used in conjunction with our present invention;

FIG. 16 depicts a flowchart of new watermark key provisioning process 1600 as used in conjunction with our present invention;

FIG. 17 depicts passive software object 1700, such as a movie, that has been watermarked in accordance with our inventive teachings to provide "break once run everywhere" (BORE) resistance;

FIG. 18 depicts amplitude waveforms for an illustrative, though abbreviated, succession of pixels contained within a passive software object, such as object 1700 shown in FIG. 17, that collectively embed a single bit, of, e.g., a watermark, into that object on a "spatially-spread" basis; and FIG. 19 depicts an active software object, e.g., executable payload code 1910, that is watermarked in accordance with our inventive teachings to provide BORE resistant software object 1900.

To facilitate understanding, identical reference numerals have been used, where possible, to designate identical elements that are common to the figures.

DETAILED DESCRIPTION

Figure 1:
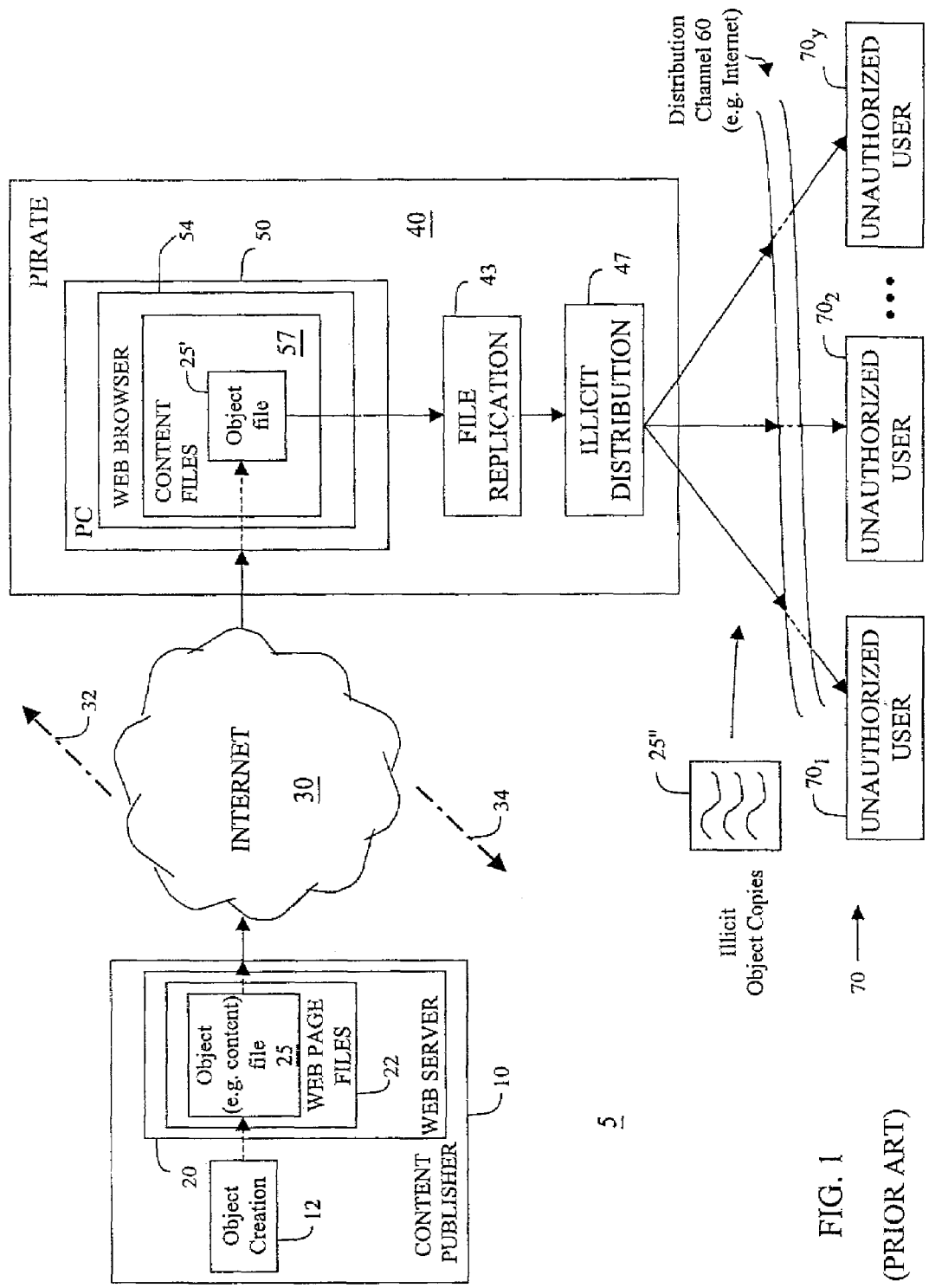
FIG. 1 depicts conventional environment 5 in which content files are illicitly distributed via the Internet to unauthorized users.

After considering the following description those skilled in the art will clearly realize that the teachings of our present invention can be utilized to protect a wide range of passive and active software objects, such as content (i.e., passive software) and executable code (i.e., active software), regardless of how these objects are actually distributed to their end-users (i.e., consumers). For purposes of this application, we define the term "software", when used herein in the context of software objects, to globally encompass both: (a) any type of digital content provided by a publisher for use by a consumer, regardless of whether that content constitutes passive content as in the case of, e.g., graphical, image, audio or video files to be played at a client PC, and (b) executable code in the case of a program to be installed and executed at that PC. These objects can be stored in a given physical media, e.g., optical or magnetic, and conventionally distributed as, e.g., packaged software to their users; or distributed directly in electronic form by being downloaded, as computer files, through networked connection to client PCs employed by these users. Illustratively, such a connection can be an Internet or intranet connection. Advantageously, our invention embeds watermark protection within a non-protected software object such that a resulting protected object is highly secure from "break once run everywhere" (BORE) attacks. In that regard, our invention substantially increases the cost of resources (in terms of, e.g., time effort and money) that a third parry would likely incur to successfully break the protection to a level that is likely to be substantially higher than any financial gain expected to flow to that party from doing so; hence, providing a significant economic disincentive to that party to attempt to break the protection. Since our invention is particularly, though nor exclusively, suited for use with downloading Internet accessible software objects from an Internet web site maintained by a content provider (e.g., publisher) to a client personal computer (PC) for use by an end-user, we will describe our invention in that context.

To clearly elucidate our invention and facilitate reader understanding, by way of background, we will first very briefly describe two concepts. First, we will succinctly discuss how software objects, which are to be protected through a digital rights management (DRM) scheme as currently contemplated in the art, are susceptible to BORE (break-once-run-everywhere) attacks, through which such objects can, in spite of a DRM system, still be illicitly and readily copied and distributed. Then, also for background, we will very briefly address conventional watermarking. Thereafter, we will generally present our present inventive teachings for forming highly BORE-resistant watermarked software objects followed by describing a networked environment for securely disseminating such objects, and then addressing, in considerable detail, specific hardware and software aspects for an inventive DRM system, executing on a client PC, that utilizes our teachings, for accessing and using these objects. Lastly, we will describe, through separate embodiments, how our teachings could be utilized to render passive and active software objects, e.g., ~movie and executable program code, respectively, highly BORE-resistant.

A. Background

1. Illicit Distribution of Internet Distributed Watermarked Content

FIG. 1 illustrates the ease with which digitized objects can be readily and illicitly distributed through the Internet to a large number of unauthorized users.

As shown, networked environment 5 encompasses content publisher 10 which, through its web server 20, is connected to the Internet to facilitate user access and content download of files that have been posted by the publisher to this server. In general, publisher 10 creates, as symbolized by creation process 12, digitized object 25 and then loads that object onto its web server. This object may be, e.g., an audio recording, such as a song, or another passive software object such as a movie or still image. Alternatively, this object may constitute an active software object, such as an executable program. Regardless of the specific form of this object, the object is usually linked through an appropriate HTML (hypertext transport mark-up language) hotlink to a web page. As such, a user seeing this page rendered through his(her) browser can suitably click his(her) mouse on the hotlink to initiate a download, via web server 20, of the file containing this object. To facilitate access, the object file is generally stored within web page files 22. To prevent unauthorized duplication, publisher 10 incorporates a software "lock" of one sort or another into object file 25. One conventional technique in the context of use with a digital rights management (DPd4) system and particularly aimed at use with relatively large objects, such as an audio or video recording, is to embed a predefined watermark (or other indicia) into the object file.

A user (not shown) seeking access to that object could establish an Internet connection through his(her) client PC (also not shown) with web server 20 and then download the "locked" object. In the absence of having downloaded a suitable ~secret" value appropriate to that object, a DRM system (not shown) residing in a client PC then employed by the user would simply inhibit the user from accessing the object file. To facilitate access, the user, once in receipt of a "locked" file, would then conduct a separate electronic transaction, via the Internet, with web server 20 to obtain a suitable software certificate, specifically a license, that contains the "secret" value (hereinafter just referred to as a "secret"). Once this certificate is downloaded and stored by the DRM system residing in the client PC, the DRM system, whenever the user attempted to subsequently access the object, would access the certificate and compare a value of the watermark in the license with a value of an actual corresponding watermark scored in the object. The secret could specify a location, in the object, at which the watermark resides. If the values of the two watermarks match, the DRM system would permit the object to be accessed, as desired, which in the case of an audio recording, may involve playing the recording to the user stationed an the client PC. Alternatively, if a mis-match occurred, then the DRM system would deny this access to the user.

Digitized content advantageously provides enhanced clarity and diminished noise over conventional analog recordings. Moreover, downloading such content over the Internet is a far more convenient and economical way for consumers to obtain it, both in terms of time and expense, than through traditional retailing or mail-order channels. Hence, Internet-based content distribution is likely to exhibit explosive growth in the coming years.

Unfortunately, the very characteristics of digital content that make it very attractive to consumers also significantly foster its illicit duplication, i.e., piracy. In that regard, by virtue of digitized data which embodies content on a legitimate copy, each subsequent copy of that data will, for all practical purposes, exactly match the original content; thus, providing the same fidelity as the legitimate copy. Hence, a pirate, having access to a legitimate copy, could, rather readily, massively produce illicit copies that, at least from a standpoint of its content, might not be distinguishable from its legitimate copy.

In particular and as shown, a pirate, such as pirate 40, can readily establish, just as any other user can, a connection, through Internet 30, to web server 20. Such a connection can be established through web browser 54 then executing on PC 50 operated by the pirate. Once a pirate accesses web server 20, he can download object file 25, just as any other user can.

Disadvantageously, this conventional watermarking approach relies on embedding a single watermark into object 25. If a pirate were to discover the watermark, thus breaking the "lock", the pirate could then excise the watermark from the object, and illicitly and massively copy, as represented by file replication operation 43, resulting unprotected object 25" to yield copies 25'". Thereafter, as represented by operation 47, pirate 40 could then massively distribute resulting illicit copies 25'" free and clear of any restriction on their use otherwise imposed through digital rights management. These illicit copies could themselves be distributed, via channel 60, such as an Internet connection with a web server maintained by pirate 40, to client computers operated by unauthorized users 70, illustratively having users 701, 702, . . . , 70y. Furthermore, each of users 70, in turn could further replicate and distribute illicit copies of object 25'", which have content essentially, if not completely, identical in quality to that of original object 25, to further unauthorized users, and so forth—all free and clear of the prior software "lock". In addition, other pirates and their channels of distribution, here collectively symbolized by arrows 32 and 34, could well exist to supply illicit copies of object 25 co further groups of unauthorized users, and so forth. Obviously, as the value of object 25 increases, so does the number of pirates which then seek to illicitly copy and distribute it for their own financial gain.

In this scenario, object 25 would be susceptible to what we refer to as a "BORE" (break-once-run-everywhere) attack. Specifically, a pirate merely needs to break one single parameter, i.e., an embedded watermark, that cryptographically protects this object and only do it once. Once the pirate succeeds, (s)he can remove the watermark from the object. The pirate then possesses the complete unprotected object to do with as (s)he pleases. At that point, content publisher 10 has effectively ceded significant control over consumer access and use of that object to the pirate. Hence, protection that a content publisher would otherwise gain through use of digital rights management, at least with respect to the illicit copies, would be completely lost to a successful BORE attack.

Given enough resources, particularly processing capacity, manpower, capital and time, a pirate could break the watermark, thus nullifying protection otherwise afforded by digital rights management. If sufficient demand exists in the marketplace for a given object—which is particularly true for a popular feature length movie, then the pirate may well have adequate economic motivation to incur the investment needed to break the watermark. In that regard, the pirate will likely incur the investment if the resulting gains to be had through illicit copying sufficiently outweigh the associated costs of all resources needed to break the watermark and make and distribute the illicit copies.

2. Conventional Watermarking

Figure 2:
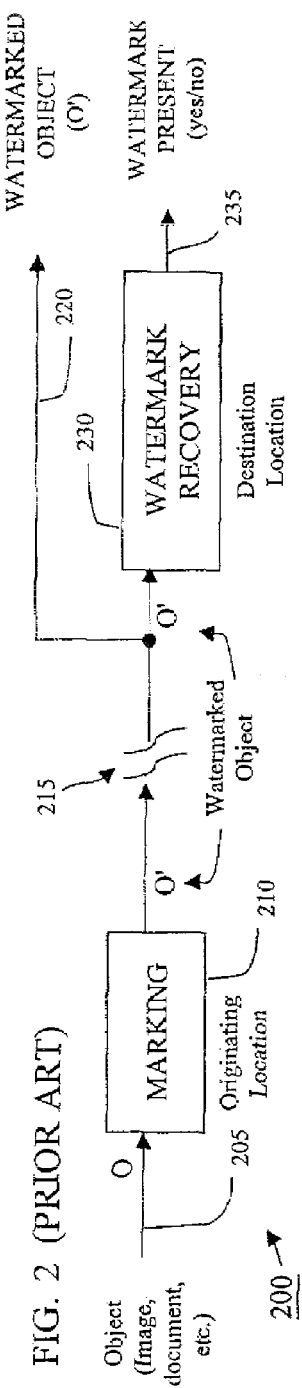
FIG. 2 depicts generalized and conventional watermarking process 200.

FIG. 2 depicts a simplified high-level block diagram of conventional watermarking process 200. In essence, an object, O, to be protected, whether it be a printed image, a document, a piece of paper currency or some other such item, is applied, as symbolized by line 205, to marking process 210 situated at an originating location. This process creates a watermark and embeds it in the object to create a watermarked object, O'. The watermarked object is then eventually transported through insecure channel 215, whether it be, e.g., transit through a public carrier or, as in the case of currency, public distribution, to a destination location. At the destination, the watermarked object is subjected to watermark recovery process 230 which attempts to recover the watermark from the object and, based on a result of the recovery process, indicates, as symbolized by output line 235, whether the watermark is present or not in object 0'. This indication can be used to signify whether watermark object 0', then situated, as symbolized by line 220, at the destination is legitimate or riot. Since the legitimacy of the document is directly governed by the security of the watermark, the watermark itself must be as difficult as possible for a third party to copy or alter.

B. Overview of Our Inventive BORE Resistant Watermarked Objects and Their Use

1. BORE Resistant Objects and Controlled Access and Use of Such Objects Through a DRM System in a Client PC.

Through our present invention, a BORE resistant object can be created by embedding a relatively large number (n, where n may be on the order of, e.g., 500-1000) of watermarks throughout a single software object (0), through use of n different secret watermark keys. That object can be either an active or a passive software object. While all the watermarks for a common object carry the same value, typically a publisher (vendor) identification (VID) concatenated with a product identification (PID) to form, e.g., a 20-bit value, each one of the secret watermark keys defines a starting location in a protected object (or, in a general sense, a pointer to a location, e.g., in time, space or frequency ("frequency locations" possibly being implemented through a spread sequence predicated on a random seed), in that object) at which a corresponding watermark appears.

The publisher of a given object not only sets the value of the watermark itself but also provides that value to a third-party watermarking authority (WA), along with an unwatermarked copy of that object (0). The WA then tests that particular copy to ascertain that it is free of watermarks. Once the WA has determined that this copy is watermark-free and has also received an appropriate certification from the publisher that the. copy is not watermarked, the WA then embeds the watermark n times, each beginning at a starting location determined by a corresponding different one of the n keys, throughout the object in order to yield the watermarked object (OH). All n keys are generated by the WA. These keys are generated once and will be universally used for, e.g., all objects, from whatever publisher or source, that are to be protected.

Since different objects will invariably vary as to their length —some objects, such as movies will be considerably longer than other objects such as audio recordings, each watermark key when used in conjunction with a given object, necessitate an object dependent interpretation, e.g., specifying, in relative (scaled fashion, a starting location, in terms of a relative byte address, in that object, at which a corresponding watermark begins. In this case, an actual address of that location is determined in terms of the value of the watermark key divided by its maximum value multiplied by a total length of that object. Rather than specifying a relative address in bytes, i.e., a spatial domain key, ~watermark key can carry a relative time value i.e., implementing a time domain key, in which the time value specifies an amount of playing time that must elapse, relative to a time at which the object commenced playing, until a corresponding watermark will be reached in the object. Regardless of the specific nature of the watermark keys used, i.e., temporally or spatially related, the WA generates all n watermark keys through constrained pseudo-random number generation.

Once the WA watermarks a particular object (O), it then provides a resulting watermarked version of that object (O™) back to its publisher. The publisher, in turn, can replicate the watermarked object as often as needed, and, if desired, serialize each resulting copy, by embedding a single so-called "fingerprint" value in each resulting object replica (copy). The fingerprint only occurs once in any copy with its value being unique to that copy. Once a copy has been fingerprinted (to yield object $O_f^{WM}$), the publisher then encrypts the fingerprinted, watermarked copy typically using a symmetric encryption key (i.e., the same key being used for both encryption and decryption). The publisher can then distribute each resulting encrypted, fingerprinted and watermarked copy of the object ($O_{fe}^{WM}$) at no-cost to any requesting user, such as here a client PC operated by that user.

Subsequently, as shown in environment 300 depicted in FIG. 3, whenever a user desires to obtain a copy of the object, that user can issue a suitable mouse click, through a browser then executing in, e.g., client PCj (400), on an appropriate hyperlink ("hotlink") for that object and depicted in a web page, provided by web server 335, maintained by the publisher. Upon receipt of a download request emanating from the client PC, and specifically issued by the browser in response to the mouse click and transmitted through Internet 30 and links 310 and 323, publisher 330, specifically through its web site 335, downloads, to the client PC, a file which contains: a certified public key (PKwD) of the publisher, a name of the object and the encrypted, fingerprinted and watermarked object ($Ore^{-)\ itself}$.

Once a user has downloaded a watermarked object, then, in order to use that object, the user, through his(her) client PC, electronically transacts, through Internet 30 and links 310 and 323, with publisher's web server 335. Specifically, in return for payment of a specific licensing fee to the publisher, web server 335 downloads to the client PC an electronic license (L), cryptographically signed by the publisher to an "enforcer" located in that PC. The license contains a rights vector, which specifies particular access rights which the publisher accords to this client PC, the symmetric encryption key and the watermark value.

Each such client PC, including client PCj (as shown, e.g., in conjunction with FIG. 4) contains an enforcer (which is shown in FIG. 4 and in detail in FIG. 6 and will be discussed shortly below) as part of a DRM system. From a data perspective, the enforcer is sited within a critical processing path, in the client PC, for the object, and specifically in a path that is difficult to bypass. With respect to active objects, i.e., executable programs, the enforcer is preferably situated within an operating system itself executing ±n the client PC. For passive objects, i.e., content such as, e.g., audio or video recordings or movie or image files, which are merely played through the client PC, the enforcer is preferably located in a media card situated within the client PC and through which that object will be rendered. In either case, each object will be passed through an appropriate enforcer which, in rum, first assumes that this object is watermarked and, as such, attempts to detect the presence of one particular watermark in that object.

In that regard, for use with any watermarked object regardless of its publisher and source, the enforcer is equipped with only one of the n secret watermark keys. This particular key will have been previously provided to the enforcer by the watermarking authority, e.g., WA 340 as shown in FIG. 3. In the case of a media card, WA 340 typically provides this one key to a card manufacturer which, during manufacture of the card, will embed this key, typically in suitably encrypted form, within circuitry on the card itself, such as by programming the watermark key into non-volatile memory situated on the card, but in a manner through which the key is only accessible to the enforcer. Alternatively, this watermark key can be separately and subsequently assigned to the client PC, and specifically the enforcer, by WA 340 through, e.g., watermark key assignment process 1500 (as shown in FIG. 15 and described in detail below).

The media card will then utilize this watermark key to detect the presence of a corresponding one of the n watermarks in all protected passive objects that will: be rendered through the card, regardless of the publisher of that object. O/S manufacturers likewise obtain a single watermark key from WA 340 for use with all different protected active objects and, similar to media card manufacturers, embed ~hat key, again in encrypted form only accessible to the enforcer here located within the O/S code itself. No correlation exists between the watermark keys and any one publisher. Where a WA is used, as shown in FIG. 3, all publishers are simply oblivious to the values of these keys. Alternatively, use of a WA may be eliminated provided object publishers exhibit sufficient trust amongst themselves, in which case these publishers, or any subset of them, can collectively generate all n watermark keys, distribute these n keys amongst all such publishers, with each such publisher then using these n keys to appropriately watermark its own objects. For purposes of the present discussion, we will assume that the watermark keys are generated, as discussed above, by WA 340 which also watermarks all objects that are to be protected—thus implementing a highly secure installation for distributing object files, over Internet 30, which advantageously eliminates any need for "trustworthy" publishers.

In any event, once the user, through client PCj (400], attempts to access a file containing a watermarked (protected) object then residing in that PC, the appropriate enforcer then examines the object, using its secret watermark key, to determine whether that object is, in fact, watermarked. If the object is not watermarked, then the enforcer permits the client PC to freely access the object, as desired by the user. Alternatively, if the object contains a watermark in a location (such as a starting location specified either in terms of, e.g., time, frequency or space) given by the enforcer's watermark key, then, the enforcer so notifies the client 0/S executing in the client PC. The client O/S accesses a license database, given the object name provided in the file, to determine whether a signed license made to the enforcer and linked, via the publisher's cryptographic signature, to this protected object then exists in that database. A parameter value in the publisher's certificate, in particular, a publisher identification (PID) value must match the same parameter value found in the watermark. If no such license is found, the enforcer inhibits any further access to the object, thus precluding any further use of that object by the client O/S or media card, as appropriate. Alternatively, if such a license is found, the enforcer determines whether parameter values contained in the license and in the file for the object match corresponding parameter values contained in the watermark value actually detected in the object. If such matches exist, then the enforcer permits access to the object in accordance with the specific usage rights specified in the license. For example, these rights, in the case of object containing an audio recording, may permit that object to be played a certain number of times~in which case the enforcer would increment a suitable "play" counter each time this object was accessed and played in order to assure a limit defined in the license was not exceeded. Once a ~play" limit was reached, the enforcer would allow no further accesses to the object. Alternatively, the rights may specify unlimited play, in which case the enforcer would permit the object to be played as often as the user requested. These rights may also specify that the object could not be copied, and so forth. We will address usage rights in considerable detail later in the discussion.

2. Effect of BORE Resistance in Circumventing and Dissipating Illicit Copying

Advantageously, by watermarking a software object through our inventive BORE resistant manner, the resulting object becomes substantially more difficult for an adversary to successfully break. The expected difficulty increases to the point where economic costs of all the resources, in terms of, e.g., time, processing ability and manpower, needed to successfully nullify the protection afforded by our inventive technique are likely to greatly outweigh any potential economic return that an adversary expects to obtain through illicit copying and distribution of the object; thus, providing a significant economic disincentive for an adversary to attempt to do so. Moreover, if in the very unlikely event such a catastrophic break were to occur, i.e., an adversary were to gain possession of all the watermark keys, the publisher, of existing pirated objects that use these keys, could, e.g., change a format of future objects and require users to download new media players that would be incapable of rendering the existing pirated objects, thus frustrating piracy of these future objects based on knowledge of these keys.

In that regard, by embedding n different watermarks into a single object and not labeling each client PC as to the specific watermark key it contains, the adversary is required to break not just one client PC to obtain its own embedded watermark key but substantially more than n such PCs to obtain all their embedded watermark keys. As such we believe that if an adversary is to obtain a sufficient number of these keys such that it can successfully defeat the BORE resistant protection with a sufficiently high probability of success, i.e., to permit a BORE-resistant object to be used by a sufficiently large number of client PCs regardless of any license restrictions, that adversary will need to break a number of client PCs that exceeds the value of n by at least 1-2 orders of magnitude.

Specifically, if an adversary were to obtain one watermark key, then at most only those particular client PCs that utilize that particular key will be able to exploit BORE-resistant watermarked objects free of any license restrictions. The number of such client PCs is typically 1/n of an total installed user base of client PCs that can utilize BORE-resistant DRM systems, which, if n is illustratively set to 1000, translates to 0.1% of this base.

Even if an adversary were to break the protection afforded by a single client PC and learn its embedded watermark key, our inventive technique will contain and over time reduce the effects of any resulting piracy. In particular, each object copy is preferably fingerprinted; though the DRM system in the client PC totally ignores the fingerprint. Should a publisher learn that a particular object was being pirated, then by obtaining a copy of the pirated object, the publisher could readily extract the fingerprint in that object. By querying its user database, the publisher could learn the identity of the client PC, in terms of its computer ID, that the pirate used, in some fashion, to commit piracy. The publisher could then instruct the WA to revoke a software certificate that held by this particular client PC for use of that particular key. If the WA is also a certifying authority (CA), then a usual client certificate can simply be revoked. In this case, the watermark key itself does not need to be certified. For purposes of simplicity, we will assume throughout the remainder of the description, that these two authorities are the same.

Figure 6:
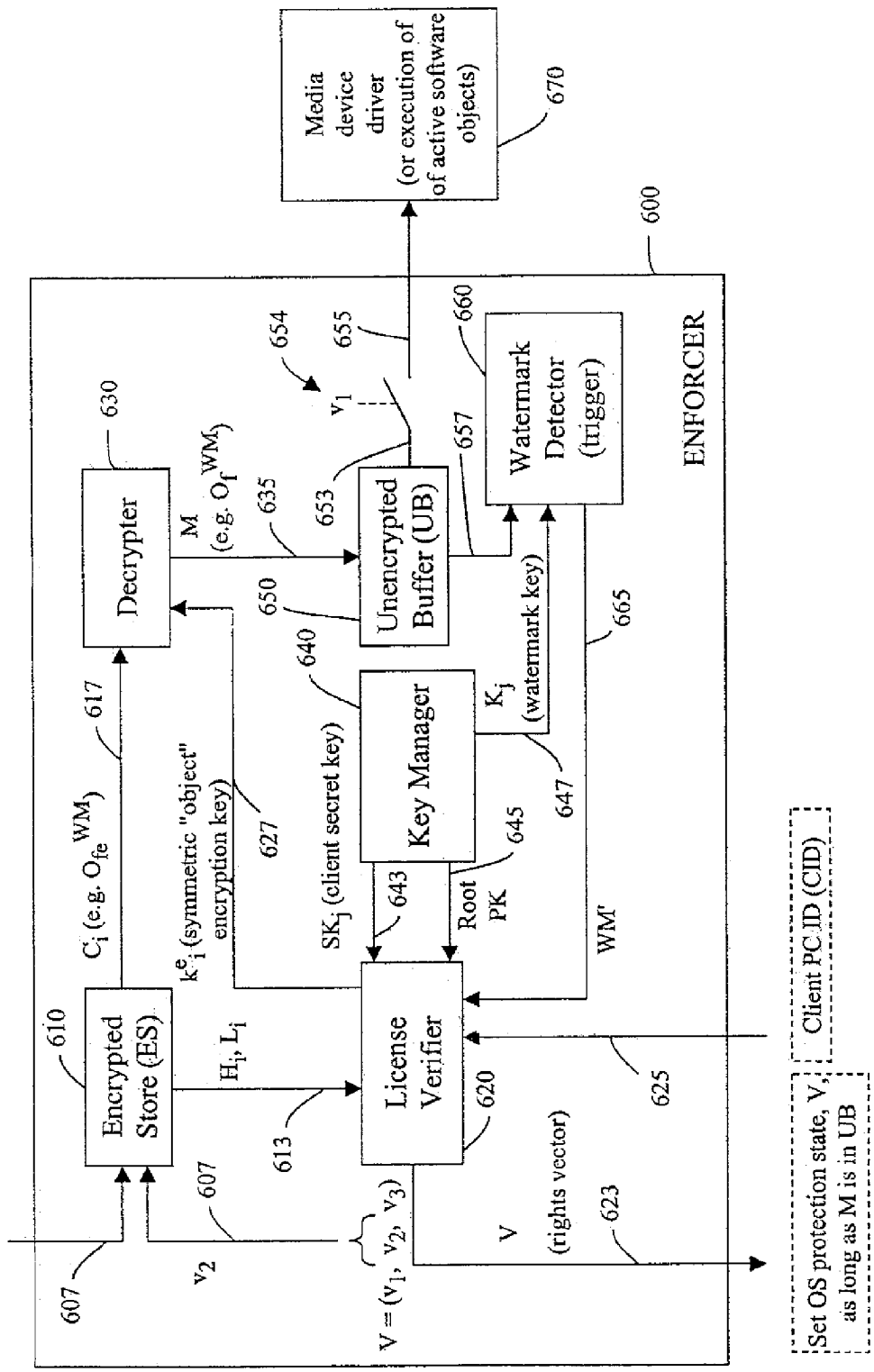
FIG. 6 depicts a block diagram of enforcer 600, shown in FIG. 4, which utilizes our present inventive teachings.

One aspect of our inventive technique is that watermark keys routinely expire after a given interval of time, as determined by, e.g., the WA, elapses, e.g., a few months to a year or two. When such a key expires, an internal key manager process (manager 640 as shown in FIG. 6 and discussed in detail below), located within the enforcer, will alert the client O/S which, £n turn, will either prompt the user to establish a secure Internet connection with the WA (such as through Internet 30 and, links 310 and 327 shown in FIG. 3, between client PCj (400) and WA server 345) or will automatically do so.

If a watermark key has been compromised by a third party, our invention reduces, if not, over time, halts, a rapidly expanding security breach of protected objects that would otherwise and conventionally occur when knowledge of their compromised key spreads throughout a large user community. Advantageously, our invention also accommodates existing needs of "innocent" users who continue to access and use those protected objects that require this key. Our invention accomplishes this by phasing out, over time, use of the compromised key and limiting its applicability to only those existing objects that have already been protected with this key.

Specifically, in the event that an existing watermark key is compromised, then that key is not immediately revoked and removed from service. To accommodate such innocent users, a watermark key can be associated with issue and expiration times Ti and Te at which the key has been issued and will expire, respectively. Hence, a watermark key K can be issued as a triple (K, Ti, Te) and, to frustrate its tampering or detection, can be stored within a secure key manager in a client PC. Should existing watermark key, K, be compromised, then a new watermark key, K' [typically chosen at random from all n existing watermark keys), with its corresponding issue and expiration times, i.e. (K~, Ti', T~') will be issued and distributed to all client PCs which have been using the compromised key. As such, each of these client PCs will have two watermark key triples: that for the existing key, K, and that for the new watermark key, K'. As indicated above, all watermarked objects will be watermarked with all n keys (including keys K and K').

A license can also have associated issue and expiration times, ti and te, respectively. For each protected object, the enforcer in the client PC must utilize both watermark keys K and K' (or, in general, all the watermark keys it has) in examining a protected object for a watermark. An object is assumed to be unprotected if the enforcer fails to find any watermarks in the object. Should the enforcer detect a watermark using either key K or K', then a proper license must exist to access this object. In order for a license to be "proper", not only must a license exist for this object but also the watermark key must expire after the license does and the license must have been issued after the watermark key was, i.e., $T_e > t_e$ and $t_i > T_i$ must both be satisfied. Even if a license exists but either relationship fails, then the license is not "proper"; hence, the enforcer denies access to this object. A watermarking authority can preclude client PCs from gaining access to any future protected objects by simply not issuing a new key to that client PC to replace a key that has expired or will expire (the latter being typified by a compromised key).

As such, client PCs can continue to utilize their existing watermark keys (e.g. key K) co access previously distributed protected objects. However over time, these keys will eventually expire and require replacement. We anticipate that although the growth of keys will monotonically increase the rate of growth will be quite low, with a client PC obtaining a new watermark key triple after the watermark keys on the order of n different client PCs have been compromised.

We believe that the sheer magnitude of the costs associated with successfully breaking a sufficient number of client PCs to completely frustrate BORE-resistant protection effectively precludes successful broad-based attacks on BORE-resistant DRM systems. Consequently, piratical acts are far more likely to occur on a far more limited basis, such as through gaining unauthorized access to a small number of watermark keys. Advantageously, our inventive technique effectively contains these attacks and, over time, As such, client PCs can continue to utilize through periodic expiration of watermark keys and selective key replacement, significantly diminishes on-going effectiveness of such attacks.

Moreover, until the client PC obtains a valid unexpired watermark key, whether as an initial watermark key for that PC or to replace an expired key, the enforcer advantageously precludes that PC from processing any object.

Client PC 400

FIG. 4 depicts a block diagram of client PC 400 in which teachings of our present invention can be implemented.

As shown in FIG. 4, client PC 400 comprises input interfaces (I/F) 410, processor 420, communications interface 430, memory 440 and output interfaces 460, all conventionally interconnected by bus 470. Memory 440, which generally includes different modalities, including illustratively random access memory (RAM) 442 for temporary data and instruction store, diskette drive(s) 446 for exchanging information, as per user command, with floppy diskettes, and non-volatile mass store 450 that is implemented through a hard disk, typically magnetic in nature. Mass store 450 may also contain a CD-ROM or other optical media reader (not specifically shown) (or writer) to read information from (and write information onto) suitable optical storage media. The mass store stores operating system (O/S) 454 and application programs 452. As used herein, computer readable medium includes memory (including random access memory), magnetic or optical media, DAT, floppy diskettes, CD-ROM, hard disk drives, and the like.

The O/S contains DRM system 456 which itself contains enforcer 600. Enforcer 600 contains encrypted store 610. This store, given a potentially large size of one or more watermarked objects it will contain, resides, as shown, within non-volatile local mass store 450 (e.g., a hard disk drive) on the client PC. Enforcers 600 and 600' are quite similar, with the primary difference between these enforcers, as discussed below, being the encrypted store used with each enforcer. The former enforcer is located within O/S 454 and is used with active software objects, i.e., executable programs. The latter enforcer resides within output interfaces (specifically media card) 460 and is used with rendering passive software objects, via that interface, through, e.g., either di6play 480 or printer 485.

DRM system 456, to the extent relevant, stores individual licenses, within enforcer 600 and specifically in a separate license database (database 570 shown in FIG. 5) situated within encrypted store 610, that have been downloaded to client PC 400 by respective software publishers to permit access to corresponding watermarked software object files. Subsequently, when access is attempted to any of these files, DRM system 456, shown in FIG. 4, interrogates this database to determine whether a license, associated with this file, then exists within the database and passes that license to the enforcer. Enforcer 600 determines whether that license permits the desired object access and use and so informs O/S 454 accordingly. In doing so, the enforcer examines the stored object file to determine whether that object contains an appropriate watermark as defined by a corresponding single watermark key embedded in the associated enforcer. If such a watermark exists with the correct value, the enforcer will permit access and use of that object in accordance with specific rights set forth in the license. In the case of passive objects where enforcer 600' is located within output interfaces 460, i.e, within a media card rather than in O/S 454, the license information is passed by DRM system 456, situated within the client O/S, to enforcer 600' in the media card.

Aside from D~M system 456, O/S 454 is conventional in nature and may be implemented by any of a wide range of commercially available operating systems, such as the WINDOWS NT operating system ("WINDOWS NT" is a registered trademark of Microsoft Corporation of Redmond, Wash.). All components of the O/S, aside from those directly associated with our present invention (specifically DRM system 456 and enforcer 600] are irrelevant to the present invention and will not be discussed any further. Suffice it to say, that application programs 452 execute under control of the O/S.

Regardless of where the enforcer is located, i.e., either O/S or media-card centric, the enforcer must be correct, isolated (in the sense of not corruptible after its installation), protect secrecy of those keys stored in it and complete ("CISC") (in the sense that it can not be bypassed when processing a protected object, i.e., all such protected objects must pass through an associated enforcer). From the standpoint of use with passive objects, a Corresponding enforcer, e.g., enforcer 600', is preferably located within~media card for several reasons: (a) locating the enforcer within dedicated hardware circuitry usually leads to a more robust and tamper-resistant implementation than otherwise, (b) searching for watermarks in a protected object, particularly such an object that is rather lengthy (e.g., a movie) may require hardware accelerators or other dedicated high-speed process±ng elements that are best relegated to a hardware sub-system rather than relying on a main system processor (here processor 420), and (C) doing so extends the path through the client PC through which watermarked Passive object files remain in encrypted form. For O/S-centric enforcer 600, its internal key manager (manager 640 shown in FIG. 6 and discussed below) is protected through "software resistance to interference" (SRI) methodology and is certified by the WA for each client PC, such as PC 400. At run time, the key manager, in turn, checks integrity of all other critical components of enforcer 600 using digital signatures of their expected vendors. To achieve this, O/S 454 can utilize an authenticated boot process to assure its own security and then establish necessary chains of trust among various components of the O/S and particularly throughout enforcer 600 and DRM system 456.

To implement authenticated boot, processor 420 would be manufactured to contain: (a) a unique public key pair, (b) a certificate, produced by a manufacturer of that processor, evidencing that the processor was built according to a known specification, and (c) a software identity register. O/S 454 would include a block of code (not shown) referred to as a "boot block". The boot block uniquely describes a single copy of the operating system, as installed into client PC 400, and, as such, will boot just that one copy and no other. An O/S identity can be established from the boot block by examining a digital signature stored with the boot block or by computing a hash digest of the boot block. While booting O/S 454, processor 420 would execute the boot block as an atomic operation to store the identity of the O/S into the software identity register. Execution of the boot block is such that the software identity register, which can be read but not modified, is sez to either the O/S identity (i.e., a boot block digest or an O/S public key) if the operation is successful, or zero if some event or circumstance subverts this operation. Rooted in this self-authentication, the O/S then continues to load and validate other blocks of code (including device drivers to be executed, DRY system 456 and enforcer 600, as well as, where appropriate, authenticating enforcer 600' and establishing a trust relationship with it). As each block of O/S code or other module, such as media card 460, is successfully encompassed by a trust relationship, O/S 454 writes the identify of that block or module to a boot log. For further details on authenticated O/S booting, the reader is referred to copending United States provisional patent application entitled "System and Method for Authenticating an Operating System to a Central Processing Unit, Providing the CPU/OS with Secure Storage, and Authenticating the CPU/OS no a Third Party", Ser. No. 60/105,891, filed Oct. 26, 1998, and which is owned by the present assignee hereof and is incorporated by reference herein.

Incoming information, such as watermarked object files, can arise from two illustrative external sources: network supplied information, e.g., from the Internet and/or other networked facility, through network connection 315 to communications interface 430, or from a dedicated input source, via path(es) 413, to input interfaces 410. Dedicated input can originate from a wide variety of sources, e.g., via a dedicated link or an external source. In addition, input information, including a watermarked object file, can also be provided by inserting either a diskette containing that file into diskette drive 446, or, if mass store 450 can accommodate removable media, inserting an optical or other appropriate removable mass media into an appropriate disk drive in the mass store from which client PC 400 will access and read the content file(s). Input interfaces 410 contain appropriate circuitry to provide necessary and corresponding electrical connections required to physically connect and interface each differing dedicated source of input information to client PC 400. Under control of the operating system, application programs 452 may exchange commands and data with the external sources, via network connection 315 or path(es) 413, to transmit and receive information, to the extent needed—if at all, during program execution.

Input interfaces 410 also electrically connect and interface user input device 490, such as a keyboard and mouse, to client PC 400. Display 480, such as a conventional color monitor, and printer 485, such as a conventional laser printer, are connected, via leads 463 and 467, respectively, to output interfaces 460. The output interfaces provide requisite circuitry to electrically connect and interface the display and printer to the computer system. As shown, output interfaces 460 contains enforcer 600'. To provide enhanced security for handling watermarked objects, output interfaces 460 could authenticate and establish a trust relationship with the display and printer, and any other output devices (not shown) connected re these interfaces, and transmit encrypted object data no these devices—provided the appropriate devices support this functionality. Though enforcer 600' will suitably decrypt the encrypted, fingerprinted watermarked object ($O_{fe}^{WM}$) using a symmetric encryption key supplied by the publisher of that object and contained in a license to use that object, interfaces 460, in turn, can utilize a predefined data or hardware-based scrambling technique or other non-processor intensive encryption methodology known to a recipient output device, such as display 480. As such, once a suitable trust relationship is established, interfaces 460 can suitably encrypt the watermarked object, transmit resulting encrypted data over, e.g., lead 46S (and/or lead 467), which, in turn, will be decrypted and rendered by a corresponding display device, such as display 480 (and/or printer 485, respectively). In this manner, use of encrypted object files will be extended ('~tunneled") completely through client PCj and devices connected to it, thus providing added security against unauthorized access and use of decrypted object content. Through use of such tunneling, and as an alternate er~b0diment of enforcer 600', only a watermark detector, e.g., detector (trigger) 660, as shown in FIG. 6 and described below, used in this enforcer could be located in output interfaces 460, as shown in FIG. 4, specifically a media card, with a remainder of this enforcer residing within DRM system 456 in the client O/S" thereby simplifying the implementation of this card. Even further, a common O/S-centric enforcer, i.e., enforcer 600, could be alternatively used, to handle both active and passive objects by employing appropriate tunneling of suitably scrambled content to the output device(s). In this case, the enforcer Would suitably scramble (or otherwise encrypt) its output decrypted content, route resulting scrambled content to the output device, which, in turn, would appropriately descramble (or decrypt) and then render that content.

As one can appreciate, our invention can be used with appropriately watermarked digital objects regardless of the modalities through which those objects are communicated to client PC 400.

Furthermore since the remaining hardware components of PC 400, are conventional and well-known, they will not be discussed in any further detail. The Web servers at the publisher and the watermarking authority, apart from not possessing a DRM system and an enforcer, possess a highly similar architecture no that of client PC 400 shown in FIG. 4.

D. Interactivity Between Publisher 330 and Client PC 400 Occurring Through Use of Inventive Process FIG. 5 depicts a high-level overview of our inventive process 500 for handling BORE-resistant objects and resulting interactivity that would occur between a publisher, e.g., publisher 330, and a client PC, e.g., $PC_j$ (400).

Initially, as indicated by block 510, a user, stationed at client PCj and interacting with a web browser executing at that PC, causes the PC to issue a request to publisher 330, specifically its web server 335, to download a file containing desired object, Ci. This request is transmitted, as symbolized by line 515, to the publisher's web server which, in response to this request and as indicated by block 520, downloads, as symbolized by line 525, a file containing an encrypted, fingerprinted and watermarked object ($O_{fe}^{WM}$). As noted above, this object can be either a passive (content) or an active (executable) software object. As the resulting encrypted file is being downloaded, the browser routes this file, via line 535, to encrypted store 610 and stores, as indicated by block 530, this file within object store 580 therein for subsequent access and use. Encrypted store 610, given a potentially large size of one or more objects it will contain, resides within a local hard disk on the client PC, Store 580 implements a repository of encrypted watermarked files to which the encrypted object 585 (C±) is added.

Subsequently, the user, through client PCj, establishes an Internet session with the publisher's web server and as, indicated by block 540, electronically transacts with that server to obtain a license to use ~th8 previously downloaded object. In that regard, the user is presented through a web page generated by the publisher's web server with a menu, list or other graphical selection mechanism through which (s)he can select an extent to which (s)he wants to access and use that object, i.e., to obtain so-called "rights". Once the user makes the selection and authorizes electronic payment for the desired rights, the browser, based on embedded code in the web page, transmits, to the publisher's web server, the rights selection, payment authorization and a computer identification (CID) associated with client BCj. Each client PC has a unique CID. The CID can be formed, in whole or in part, by illustratively a processor serial number (PSN) that has been embedded into the processor itself, e.g., processor 420 of client PC 400 shown in FIG. 4, during its manufacture.

Figure 5:
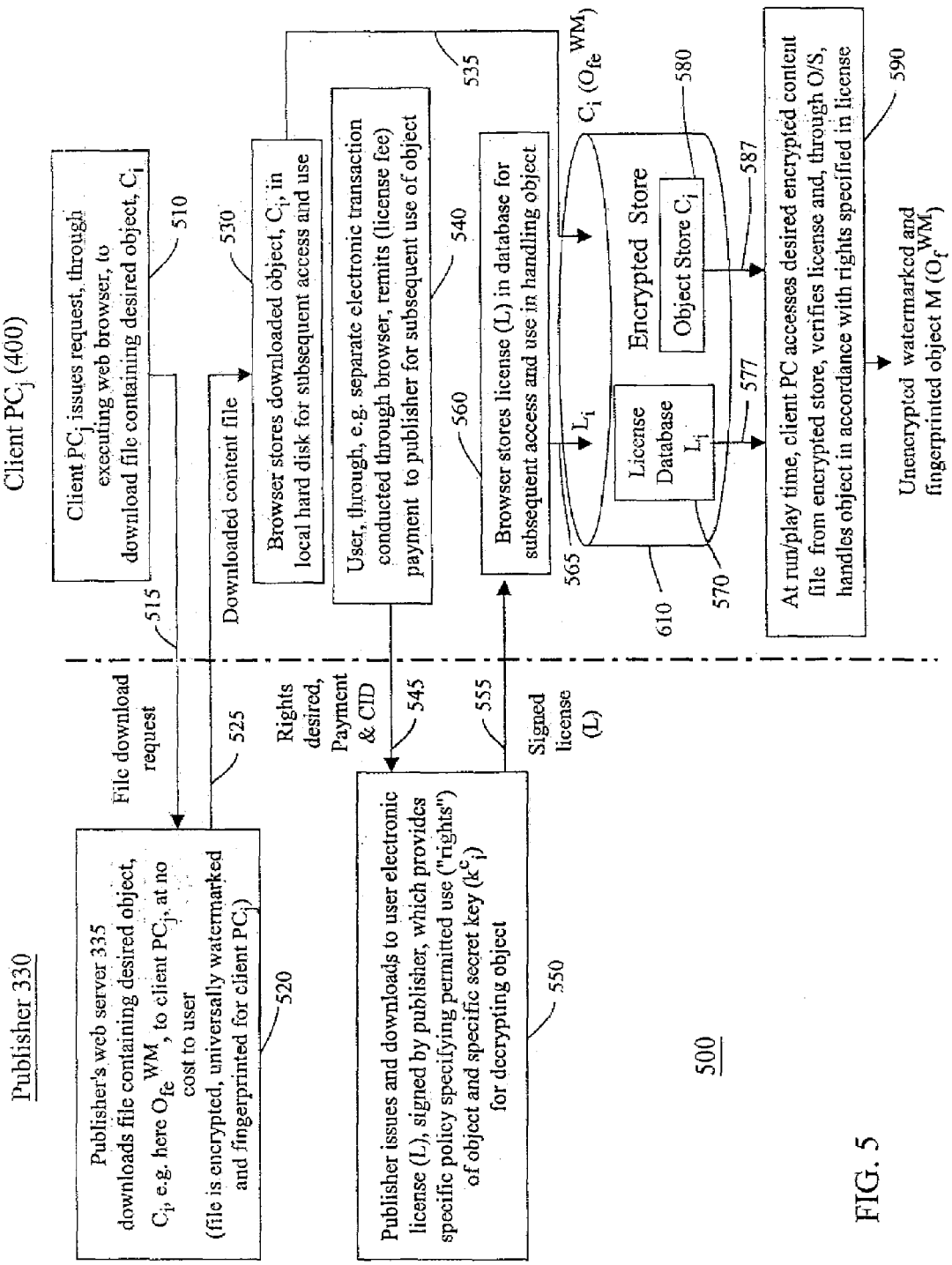
FIG. 5 depicts a high-level overview of our inventive process 500 for handling software objects, protected in accordance with our inventive teachings, as part of a digital rights management system (DRM) and resulting high-level interaction between a publisher and a client PC with respect to those objects.

Once this information is transmitted to the publisher's web server, that server issues, as indicated by block 550 shown in FIG. 5, an electronic license (Li) and transmits, as symbolized by line 555, that license to the client PC. This license, which is signed by the publisher, specifies, among other parameters—which have been alluded to above and will be discussed in detail below, the specific rights ef access and use that have been accorded to client PCj for the downloaded object along with a secret key to decrypt this object. This key, as previously noted, is a symmetric encryption key, i.e., the same key previously used by the publisher to encrypt the object. Upon receipt of this license, :the browser routes this license, as symbolized by line 565, to encrypted store 610 and specifically stores this license, within license database 570, for subsequent access. Store 570 contains a repository of licenses for each watermarked encrypted object which the use9 has downloaded to client PCj or otherwise has in his possession and desires to access through this PC.

Subsequently, when the user stationed at the client PC attempts to access any watermarked object, the client PC, as indicated in block 590, will access the encrypted object, Ci, from encrypted store 580 (or, if the object does not then reside in store 580, will prompt the user to either download that object from the publisher's web site or insert a diskette containing that object into the client PC for subsequent access). Assuming the encrypted object then resides within store 580, that object will be accessed as symbolized by line 587. In addition, the client PC, through execution of block 590, will determine whether a license (Li) then exists in license database 570 for this object. If such a license is found, the license is accessed as symbolized by line 577. Thereafter, block 590 will verify the license and, if the license is valid, decrypt the object, appearing on line 587, and instruct the O/S in client PCj to utilize the resulting decrypted fingerprinted, watermarked object in accordance with the rights specified in the license.

E. Enforcer 600

FIG. 6 depicts a block diagram of inventive enforcer 600 shown in FIG. 4.

This enforcer contains encrypted store (ES) 610, license verifier 620, decrypter 630, key manager 640, unencrypted buffer 650 and watermark detector (trigger) 660.

ES 610 stores encrypted object files and, as noted above, is situated in a hard disk residing on client PCj. In the case of enforcer 600' which is embedded within a media card, its encrypted store, given its likely size, will still be located on the hard disk of client PCj, rather than directly within enforcer 600', and will pass, as noted below, encrypted information, which only this enforcer can decrypt to remaining portions of the enforcer which are located on this card.

License verifier 620 verifies a license as having been signed by its issuing publisher (vendor) and then extracts various parameters from the license, specifically a rights vector, a product identification (PID) value and a symmetric encryption key provided by the publisher, and, using the value of the rights vector, sets a protection state, of the client O/S, associated with a protected object, which is the subject of the license, and which governs further access and use of this object. Decrypter 630 decrypts an encrypted object file using the symmetric encryption key supplied by the publisher and contained in the license. Key manager 640 stores the sole watermark key (and, when used, its corresponding issue and expiration times, Ti and respectively—though these times are not shown simplify the figure) assigned to the enforcer along with a public key pair (secret key SKj, public key PKj) and a public-key certificate for PKj, of client PCj and a cryptographic parameter "root PK" (root public key of the WA) which has a value common to all client PCs. The root PK parameter originates with the WA and is used, by the license verifier, to cryptographically verify the publisher's (vendor's) certified public key and by the publisher (vendor) to verify the public key of the client PC.

Unencrypted buffer 650 stores files containing unencrypted objects (objects M ($O_{fe}^{WM}$)), i.e., encrypted, fingerprinted and watermarked objects (C±) that have been decrypted through decrypter 630 using the symmetric encryption key provided by the publisher. In addition, files containing those objects that are not protected, i.e., for which no license exists and which are no~ encrypted, are routed, by the DRM system directly co buffer 650, rather than passing through ES 610. Watermark detector (trigger) 660, using the single watermark key assigned to the enforcer, detects the presence of a corresponding watermark in each protected object presented to the enforcer. If a watermark is found, detector 660 passes the value of the detected watermark to license verifier 620.

Figure 3:
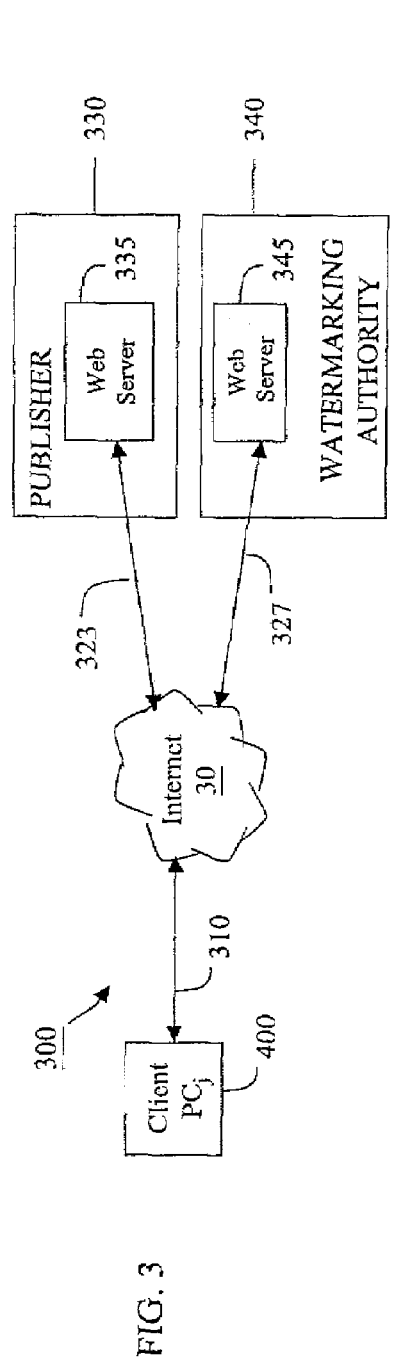
FIG. 3 depicts networked environment 300 which is utilized by our present inventive teachings.

In operation, an incoming encrypted object file, including a header (Hi) and an encrypted, fingerprinted and watermarked object ($O_{fe}^{WM}$)—all originating from a publisher's web server, such as server 335 shown in FIG. 3, is applied as input, as symbolized by line 607 shown in FIG. 6, to enforcer 600 and specifically to ES 610 which stores that encrypted object file for future access and use.

Figure 10:
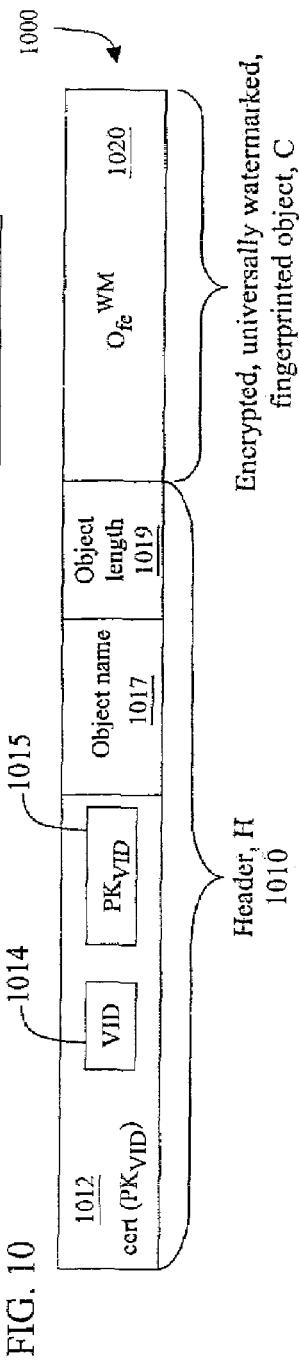
FIG. 10 depicts basic constituent fields of license (L) 1000 as employed by our present invention.

Subsequently, whenever a user attempts To access and use this encrypted object file, the ES reads the header from this file and passes, as symbolized by line 613, the header to license verifier 620. In addition, using, e.g., an object name specified in the header, the ES also accesses the license (Li) for this object from license database 570 (see FIG. 5) and passes, also symbolized by line 613 shown in FIG. 6, this license to the license verifier. The ES also directs the encrypted, fingerprinted and watermarked object itself (Ci, also shown as $O_{fe}^{WM}$), as symbolized by line 617, to decrypter 630. For any encrypted object, Ci, its associated header contains, for header (H) 1010 shown in FIG. 10: vendor's certificate 1012 which itself contains certified public key (PKvID) 1015 of the publisher (vendor) of that object and vendor identification value 1014 (VID)) of the provider (vender or publisher) of that object; object name 1017; and object length {e.g., in bytes} 1019. The header is followed in the encrypted object file by associated encrypted, fingerprinted watermarked object ($O_{fe}^{WM}$) 1020 itself. Though nor specifically indicated in the figure, this object may also be signed. The header may contain additional fields (not shown) as required by an implementation of the DRM system and/or enforcer 600 (and/or 600') used in connection therewith. For object 1020, its object name 1017, as well as any of the other fields (if needed and not shown) in the header, are used to identify a corresponding license (e.g., Li), stored in license database 570 shown in FIG. 5, for that particular object. Object name field 1017, shown in FIG. 6, can be eliminated if the encrypted object and its license are stored together within encrypted store 610. In contrast with the object itself, the header is not encrypted, watermarked nor fingerprinted.

Generally speaking, a license, Lj, for client PCj to use a particular protected object, has the following structure, as given in equation (1) below:

$$L_j = ENCRYPT_j(SIGN_{VID}(V, P_{ID}, k^e_i, CID_j, t_e, t_i)$$

where: $ENCRYPT_j$ signifies encryption using a public key associated with client PCj;

$SIGN_{VID}$ represents a signature operation, with message recovery, of a publisher (vendor) of the object;

V is a rights vector which, through a number of illustratively single-bit values, specifies particular permissions accorded to client PCj regarding access and use of the licensed object;

PID is a product identification value that forms a portion of the watermark in the object, the watermark being (VID, PID) as previously noted above;

$k^e_i$ is the symmetric encryption key used by the publisher to encrypt the fingerprinted, watermarked object;

$CID_j$ is the computer identification value for client PCj $t_e$ and $t_i$ are expiration and issue times, respectively, of the license, When a license is passed to verifier 620, the verifier, using the root PK value stored in key manager 640 and supplied as symbolized by line 645, will first verify the signature in the license as that associated with the publisher, and, then, once the signature is verified, will extract the rights vector, PID value and symmetric encryption key from license. The verification operation is shown in detail in FIGS. 13A and 13B, within operation 1300, and will be specifically discussed below in conjunction with those figures.

Once the symmetric encryption key, rights vector and PID value are extracted from the license, license verifier passes, as symbolized by line 627, this encryption key to decrypter 630. The decrypter then uses this key to decrypt the encrypted object file, Ci ($Of^{eWM}$) to yield decrypted, fingerprinted and watermarked object M ($Of^{WM}$). This latter object, is routed, as symbolized by line 635, to unencrypted buffer 650 for storage therein. Once the decrypted object is stored within buffer 650, or at least a sufficient amount of it that contains the corresponding watermark specified by the watermark key (Kj) stored within key manager 640, trigger 660 determines whether the corresponding watermark exists in the decrypted object. In particular, key manager 640 provides, as symbolized by line 647, the watermark key for client PCj, to trigger 660. With this key serving, in a general sense, as a pointer in time, space or frequency as appropriate, to the corresponding watermark embedded in the object, trigger 660 examines the object to locate the corresponding watermark therein and then suitably inform license verifier 620. In that regard, if trigger 660 locates the watermark, then the trigger extracts an actual value of the watermark (WM') embedded in object M and provides this value to the verifier.

Figure 14:
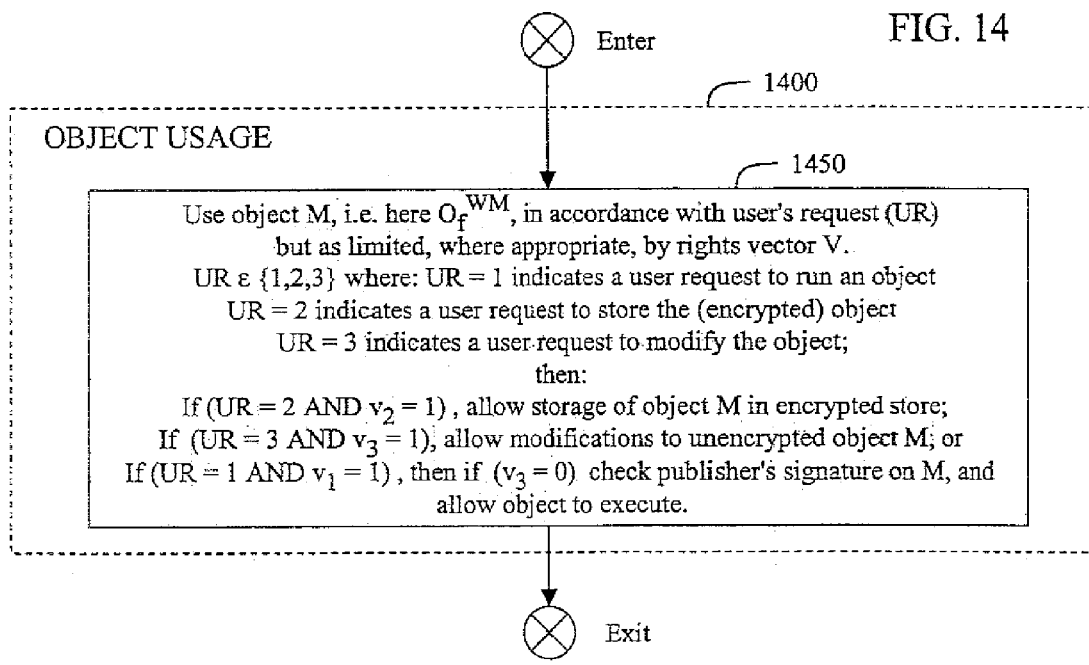
FIG. 14 depicts a flowchart of object usage operation 1400 that occurs within process 700 shown in FIG. 7.

Verifier 620, in turn, compares the VID value contained in header 1010 and the PID value specified in the license (these VID and PID values being "expected" values] to actual VID and PID values extracted from the watermark detected in the object to determine if identical matches exist between the actual and expected values of the PID, and between the actual and expected values of the VID. Most importantly, the verifier also checks if the license is signed by the publisher whose PID value was found in the detected watermark. To accomplish this, the verifier requires the publisher's certificate, cert(P-KvID). The encrypted store delivers this certificate together with the license. If issue and expiration times are used for both watermark keys and the license, verifier 620 will also determine whether the license was issued later than the watermark key and expires before the watermark key (i.e., "issue/expiration time conditions"). If these matches occur, the license is properly signed and, when applicable, the issue/expiration time conditions arc met, verifier 620 passes, as symbolized by line 623, the value of the rights vector V, also specified in the license, to the client O/S, as the protection state of this object, co control further access and use of object Ci while that object resides in decrypted form (as object M) within unencrypted buffer 650. In particular, if the rights vector illustratively contains three separate one-bit values (v1, v2 and v3), as shown in FIG. 6, these bits, based on their current states, may specify use of the object as follows: v1=allow/disallow running; v2=allow/disallow permanent storage; and vs=allow/disallow manipulation. Hence, bit v1 would be applied to control a state of software switch 654 situated at an output of buffer 650. In the case of active objects, this switch, once set, would effectively permit the object to be executed or not, i.e., effectively pass through line 653, via switch 654, to output lead 655. In the case of passive objects, this switch would either permit a media driver, which will be used in rendering that object through a media card, to either render that object or not, again symbolized by effectively passing that object through line 653, via switch 654 to output lead 655. Bit v2 would be applied, as symbolized by line 607, to ES 610 to specify whether the encrypted ob3ect (Ci) can remain within this store, or is to purged from this store after the object, in decrypted form, has passed through unencrypted buffer 650 and has either been executed or—rendered, as appropriate. In that regard, the value of the rights vector for a given object taken in conjunction with a current user request to access and/or use that object will, through object usage process 1400 (which is shown in FIG. 14 and discussed in detail below), govern how that request will be handled.

Clearly, a three-dimensional rights vector (as will be assumed throughout the ensuing discussion) is merely illustrative. Such vectors can contain additional dimensions to implement enriched permissions, such as with increased granularity, or reduced dimensions to implement broadened (less granular, i.e., simplified) permissions.

F. Detailed Methodology of Creation and Use of BORE-Resistant Software Objects

1. Overall View

Figure 7:
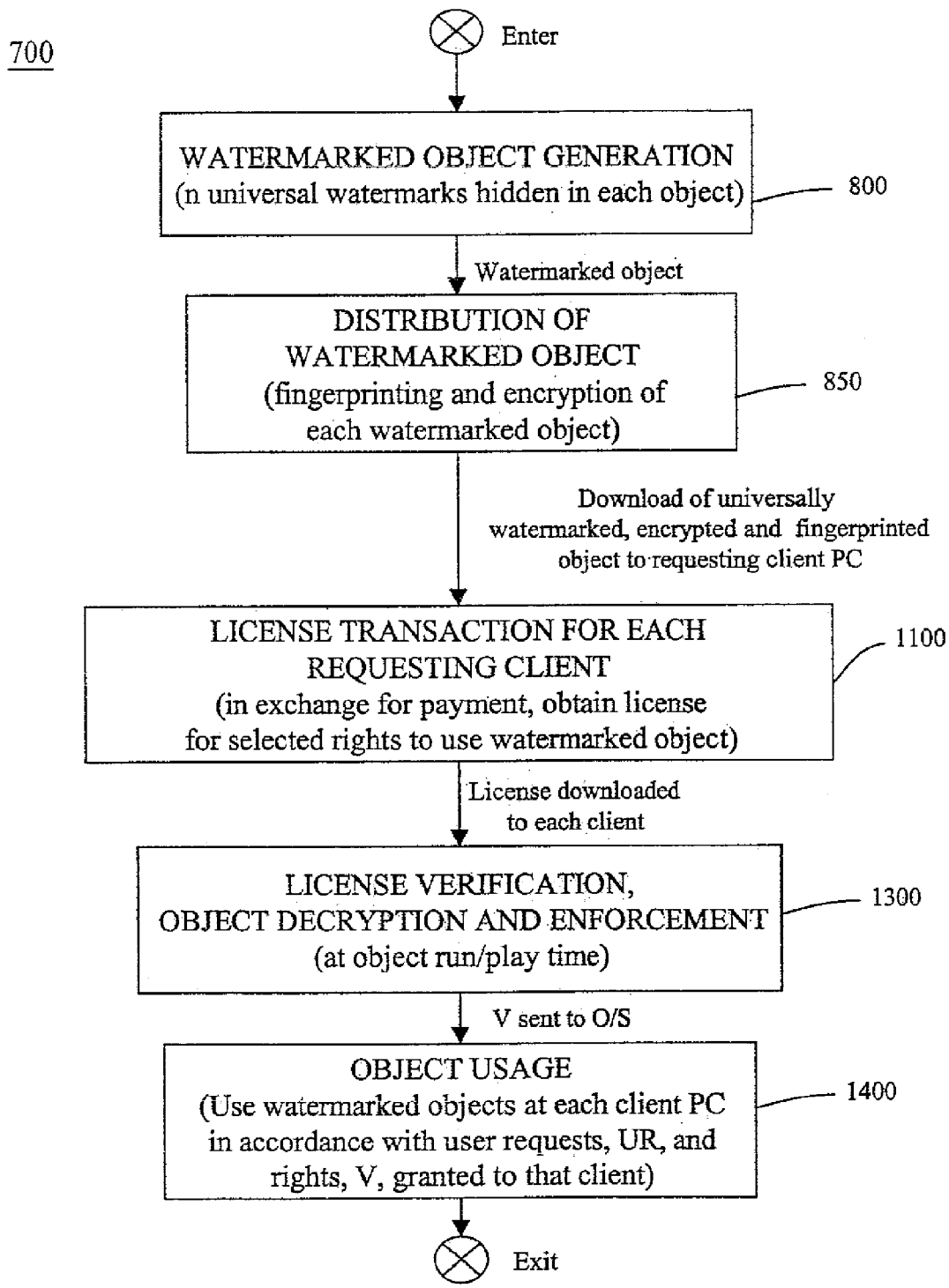
FIG. 7 depicts a high-level flowchart of process 700 involving publisher 330, watermarking authority 340 and client PCj (400) and which implements our inventive teachings for collectively creating and downloading protected object files from the publisher to the client PC and for subsequently controlling access and use of those objects at the client PC.

FIG. 7 depicts a high-level flowchart of process 700 involving publisher 330, watermarking authority 340 and client PCj (400) and which implement our inventive teachings for collectively creating and downloading protected object files from the publisher to the client PC and for subsequently controlling access and use of those objects at the client PC.

Process 700 contains five basic operations: watermark object generation operation 800; watermarked object distribution operation 850; license transaction operation 1100; license verification, object decryption and enforcement operations 1300; and object usage operation 1400.

Figure 8:
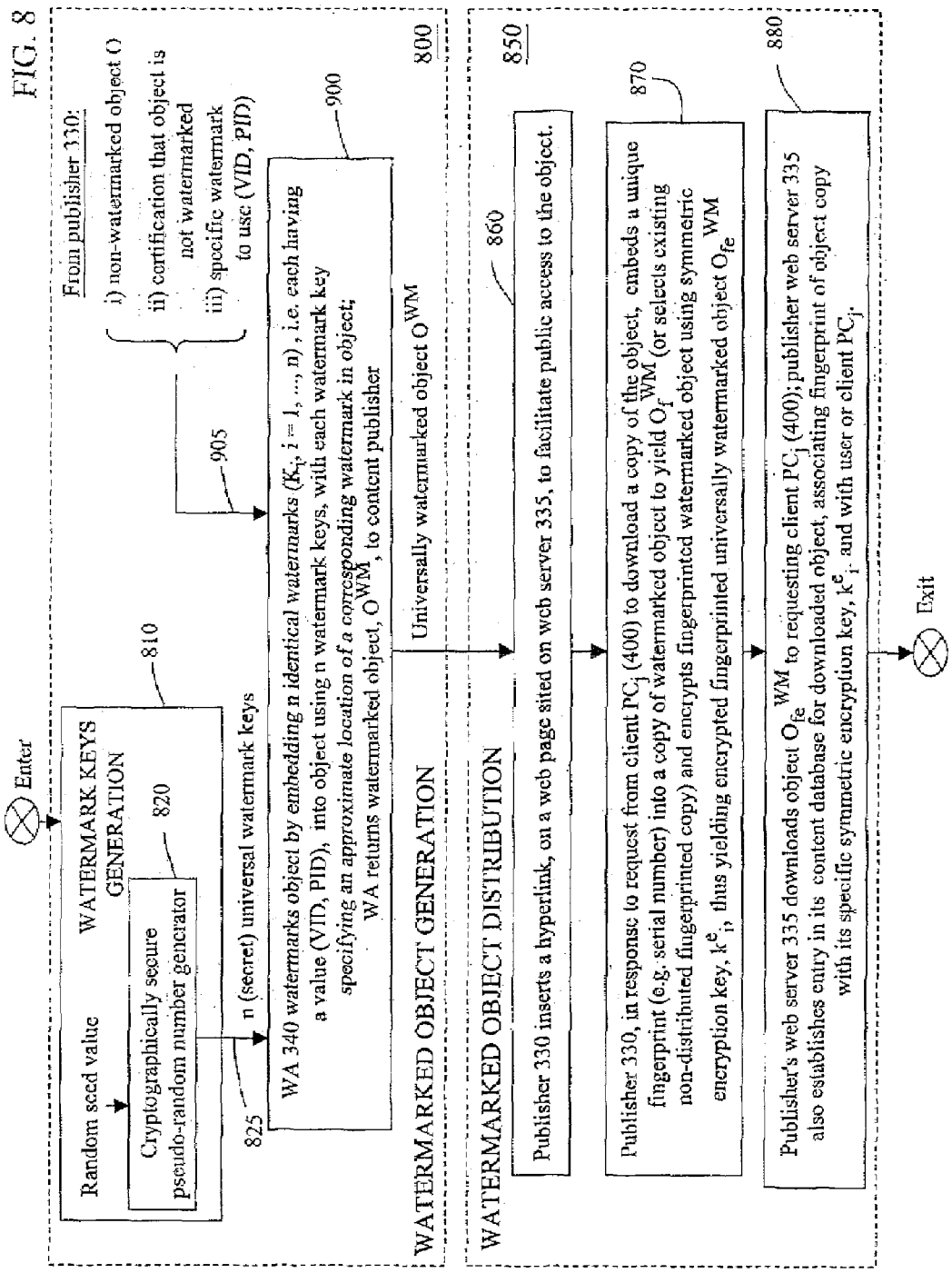
FIG. 8 depicts a flowchart of watermarked object generation operation 800 and watermarked object distribution operation 850, which both occur within process 700 shown in FIG. 7.

Upon entry into process 700, watermark object generation operation 800 (which is shown in detail ~n FIG. 8 and discussed in the accompanying text below) is performed collectively by a publisher, e.g., publisher 330 (see FIG. 3), and the watermarking authority, e.g., WA 340, ~o create a watermarked software object In that regard, operation 800, as shown in FIG. 7 and in detail in FIG. 8, involves creating a set of n watermarks and then embedding those watermarks within the non-watermarked object. The WA creates the n watermarks just once, but then uses the same set of n watermarks to universally watermark all non-watermarked objects which publishers subsequently supply to the authority for watermarking.

Once a watermarked object ms created, operation 850 (also shown in detail in FIG. 8 and discussed in the accompanying text below) is performed by the publisher to: produce a replica (copy) of the watermark object; impart a fingerprint, should it be used, into that object replica; and encrypt a resulting fingerprinted object for a requesting client PC, e.g., PC 400; and finally download a particular encrypted fingerprinted and watermarked object to than client PC. Operation 850 is performed every time a client PC (or other computer) requests a download of a watermarked object.

After a client PC receives a downloaded encrypted, fingerprinted and watermarked object file, operations 1100 (shown in FIG. 7 and in detail in FIS. ii and discussed in the accompanying text below) are performed between the client PC and the publisher to effectuate a license transaction. As a result of these particular operations, a user stationed at the client PC will submit payment for specific rights to access and use the downloaded object and then receive an electronic license that conveys certain rights to the client PC for appropriately accessing and using that object.

Operation 1100 is performed each time a user stationed at a client PC desires to obtain a license to use a protected object. Though, normally, a client PC will perform operation 1100 after a corresponding object has been downloaded through operation 850, the ordering of these two operations can be reversed.

Thereafter, whenever the client PC attempts to access a downloaded encrypted, fingerprinted and watermarked object file, operation 1300 (shown in FIG. 7 and in detail in FIG. 13 and discussed in the accompanying text below) is performed to: verify the license, decrypt the downloaded object and enforce whatever restrictions, as specified in the rights contained in the license, exist on the client PC for subsequent access and use of the downloaded object. Once' this occurs, object usage operation 1400 (shown in FIG. 7 and in detail in FIG. 14 and discussed in the accompanying text below) occurs to permit the downloaded object to be used, as requested by the client PCr but only to an extent consistent with the rights specified in the license. Once the object is fully used or its usage is inhibited, process 700 concludes its execution for this object. Operations 1300 and 1400 are performed each time a client PC attempts no access or use a protected object previously downloaded to that PC.

2. Watermark Object Generation Operation 800 and Watermark Object Distribution Operation 850

FIG. 8 depicts a flowchart of watermarked object generation operation 800 and watermarked object distribution operation 850. As noted above, operation 800 generates a watermarked object; while operation 850 distributes encrypted copies (replicas] of that watermarked object, each with a unique fingerprint, no, e.g., all requesting client PCs.

In particular, upon entry into operation 800, the WA authority, as indicated in block 810, creates the set of n different universal watermark keys (Ki, where 1=i, 2, . . . , n], where the value of n is nor critical but should be sufficiently large, such as, e.g., on the order of 500-1000. These keys are created, as indicated in block 820, by applying a random value as a "seed" no a conventional cryptographically secure pseudo-random number generator no generate n pseudo-random numbers, where each resulting number will be different watermark key, Since all the watermarks themselves are identical and fixed to a certain length, e.g., 20-bits—though the length itself is not critical, the pseudo-random numbers are constrained such that a spreading distance® between any two successive watermarks within the object is sufficiently large such that the watermarks do not overlap. In that regard, if spatially or temporally distributed watermarks are used, then distance r specifies, typically in bytes or elapsed time, a minimum distance between two successive watermarks in an object. Alternatively, the watermarks, some or all of them, can be embedded on a spread-frequency basis, where all the spread-frequency watermarks overlap temporally. Inasmucb as the location of all the individual watermarks have a very low cross-correlation (owing to the pseudo-random nature of the watermark keys and spread sequences), the watermarks can be readily separable in a frequency domain with distance r being a minimum distance between corresponding frequency ranges occupied by two successive watermarks. If desired, the spreading distance, r, applicable to any watermark can be encoded into its associated watermark key. Block 810, which is shown within operations 800 for completeness, will be performed just once by the WA such that a single set of n watermark keys is generated and then universally used across all objects, regardless of their source (i .e., their publishers), that are to be watermarked by the WA.

To watermark an object file, a publisher supplies, as symbolized by line 905, the WA with: (a)–the non-watermarked version (0) of the object, (b) a certification that this particular object is not watermarked, and (c) a specific value to use as the watermark. This value is typically a 20-bit concatenation (VID, PID) of the vendor (publisher) identifier value (VID) followed by the product ID value (PID). Each publisher carries a different identifier the extent, a publisher and its vendor are different, each may carry its own different VI); for simplicity, we have assumed for this description that they are the same; though they need not be) as does each different object (but not different replicas of the same object). In that regard, the watermark value for movies X and Y from publisher Z will carry the same VID value but different corresponding PID values.

In response, the WA authority, as indicated in block 900, embeds n watermarks, each having the identical watermark value as supplied by the publisher, into the non-watermarked object. Each of the n watermark keys generally defines a pointer no a location, e.g., a starting location, spatially or temporally (or in a frequency range—though for simplicity, we will limit our discussion to watermarks that are temporally or spatially embedded), in the object an which a corresponding watermark will be embedded. As honed above, object sizes (file lengths) can vary significantly from one object to the next. Hence, the location of each watermark is necessarily scaled to size of the particular object and is interpreted in an object dependent manner based on object size. Once the resulting watermarked object, $0^{TM}$, is generated, operation 800 completes. Subsequently, we will describe, in conjunction with FIGS. 18 and 19, illustrative techniques for embedding individual watermarks within a passive object, such an image or video frame, and within an active object.

Figure 9:
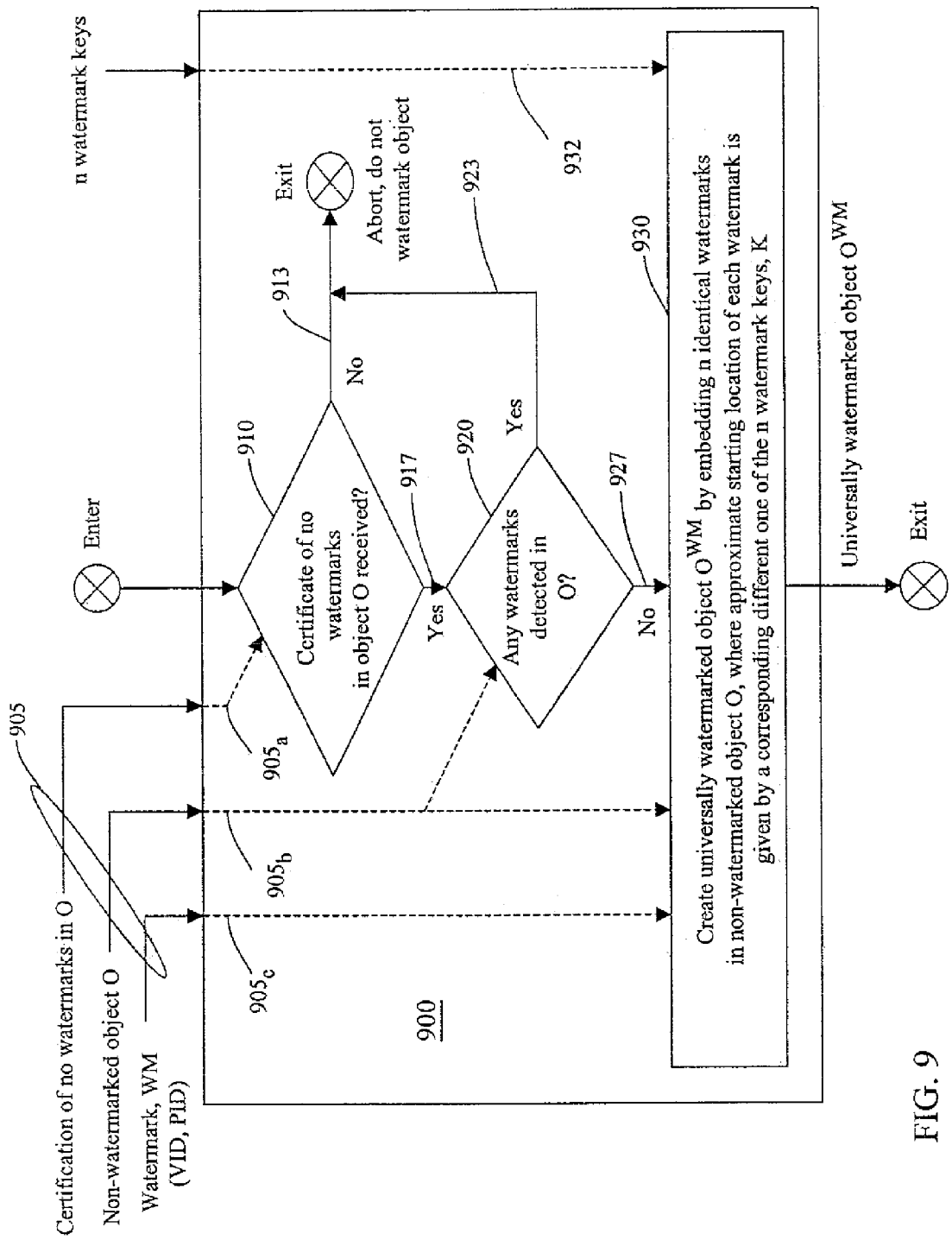
FIG. 9 depicts a flowchart of operations performed by block 900 that occurs within watermark object generation operation 800 shown in FIG. 8.

FIG. 9 depicts a detailed flowchart of operations performed block 900 by the WA. In particular, upon entry to process 900, the WA authority determines whether the publisher has provided, on input line 905$a$, a certificate which certifies that object O, to be watermarked, does not contain any watermarks. If no such certificate has been provided, then the WA simply assumes that the incoming object (O) contains a watermark and will not watermark that object. In this case, execution simply exits from block 900, via No path 913 emanating from this decision block.

Alternatively, if the publisher has provided such a certificate, the decision block 910 routes execution, via Yes path 917, to decision block 920. By executing this latter decision block, the WA analyzes the incoming object, symbolized as appearing on input line 905$b$, provided by the publisher to determine whether, in fact, this object contains any watermarks, regardless of the certificate received from the publisher that the object is watermark-free. If any watermarks are detected, then the WA will not watermark this object. In this case, execution simply exits from block 900, via Yes path 925 emanating from decision block 920.

If, however, the WA fails to detect any watermarks in the incoming object (0), then execution proceeds, via No path 927, to block 930. The WA, through execution of block 930, accesses, as symbolized by line 932, the n universal watermark keys previously created by the WA and obtains, via input lines 905$b$ and 905$c$, the non-watermarked object itself and the watermark value. With this information, block 930 embeds n watermarks in the object, with each watermark containing the identical watermark value but having, e.g., a relative starting location in the object (relative to the length of the object) specified by a corresponding one of the n watermark keys. The result of block 900 is a watermarked object $0^{WM}$ that contains n identical watermarks embedded through a set of n corresponding universal watermark keys.

For further elucidation, now refer to FIG. 17 which depicts illustrative object 1700, here a digitized movie, that has been watermarked, by the WA, in accordance with our inventive teachings. Object 1700 is formed of a sequence of digitized video frames 1710, Specifically frames $1710_1, \ldots, 1710_k, \ldots, 1710_i, \ldots 1710m, \ldots, 1710x$ (this last frame is non shown) (where k, i, m and x are all integers). A total of n separate but identical watermarks 1720, i.e., $1720_1, 1720_2, \ldots, 1720n$, has been embedded in object 1700 (where n is much less than X). Each watermark is illustratively 20-bits long (having bit fields $1730_1, 1730_2, \ldots, 1730_{20}$) and contains a common illustrative value 1, 0, . . . , 1 (the complete value being irrelevant for purposes of ElG. 17). Each bit of a watermark is embedded in a single frame of object 1700; hence, each watermark extends over twenty successive frames. The starting position of each watermark is specified by a corresponding one of n different watermark keys. Since these keys, ms discussed above, are generated on a pseudo-random basis, watermarks 1720 are themselves distributed, as shown, throughout object 1700 on a pseudo-random basis. We will discuss later, in the context of FIG. 18, a technique that can be used to embed a single watermark bit within a frame of a passive object, such as, e.g., a frame or an image, and in the context of FIG. 19, a technique for embedding a watermark with an active (executable) software object.

Now, returning no FIG. 9, once the object ms fully watermarked, the WA returns that watermarked object (here $0^{WM}$) to publisher 330 for subsequent distribution. Publisher 330 then performs watermarked ob3ec=distribution operation 850, also shown in FIG. 8, to disseminate, via web server 335, appropriately encrypted and fingerprinted replicas (copies) of that watermarked object to all requesting client PCs.

In particular, upon entry into operation 853 shown in FIG. 8, block 860 is first performed through which the publisher inserts an entry, including a hyperlink ("hotlink"), on an appropriate web page, accessible to the public, no initiate a download (facilitate access), over the Internet, of the object. Thereafter, as indicated by block 870, once a request is received from, e.g., client PCj (400) to download this object, the publisher embeds a unique fingerprint within a copy of the watermarked object. The fingerprint is totally ignored by the enforcer and DRM system in each client PC. However, to frustrate detection by an adversary, the fingerprint can be embedded in an object in a similar, if not identical fashion, as is a watermark.

The publisher, typically through its web server 335, then encrypts the resulting fingerprinted and watermarked object ($Of^{WM}$) with a symmetric encryption key (ka±). The same key is used both by the publisher to encrypt the object and later by the client PC, which receives the encrypted object, to decrypt it. After this web server filly generates the encrypted fingerprinted and watermarked object, Ofe$^{WM}$, this server then downloads, as indicated in block 880, this particular object to the requesting client PC. In addition, the publisher also maintains, typically on its web server 335, a user database (not specifically shown) co associate particular downloaded copies of the object with given client PCs. Once a copy of the object is downloaded, then, as indicated in block 880, the publisher establishes an entry in this database for this object which associates this particular copy, in terms of its embedded fingerprint, with a symmetric encryption key used to encrypt this object and a user or the requesting client PC. Later, should a user obtain a license to access and use this downloaded object, the publisher will complete this entry in the database by adding the CID of the client PC co which the user downloaded that copy of object. Once object Ofe$^{WM}$ is fully downloaded to the client PC and an appropriate entry has been established in the user database, execution of block 880 ends. Execution then exits from operation 850. To further safeguard privacy of user data, a conditional association between the user, in terms of the CID of his(her) client PC, and the particular copy downloaded so that client PC in terms of the fingerprint of that copy, can be maintained in~database held by a trusted third party. Hence, the fingerprint could point to an entry, in that database, specifying the client PC; thus, associating that particular copy to that PC. However, the third party will only be able to expose a client pc-fingerprint association after evidence of a suitable level of piratical or fraudulent act which involve than client PC is shown to the third party.

While operation 860 is performed once by the publisher, web server 335 performs operations 870 and 880 each time a user request occurs to download a copy of a protected object.

3. License Transaction Operation 1100

Figure 11:
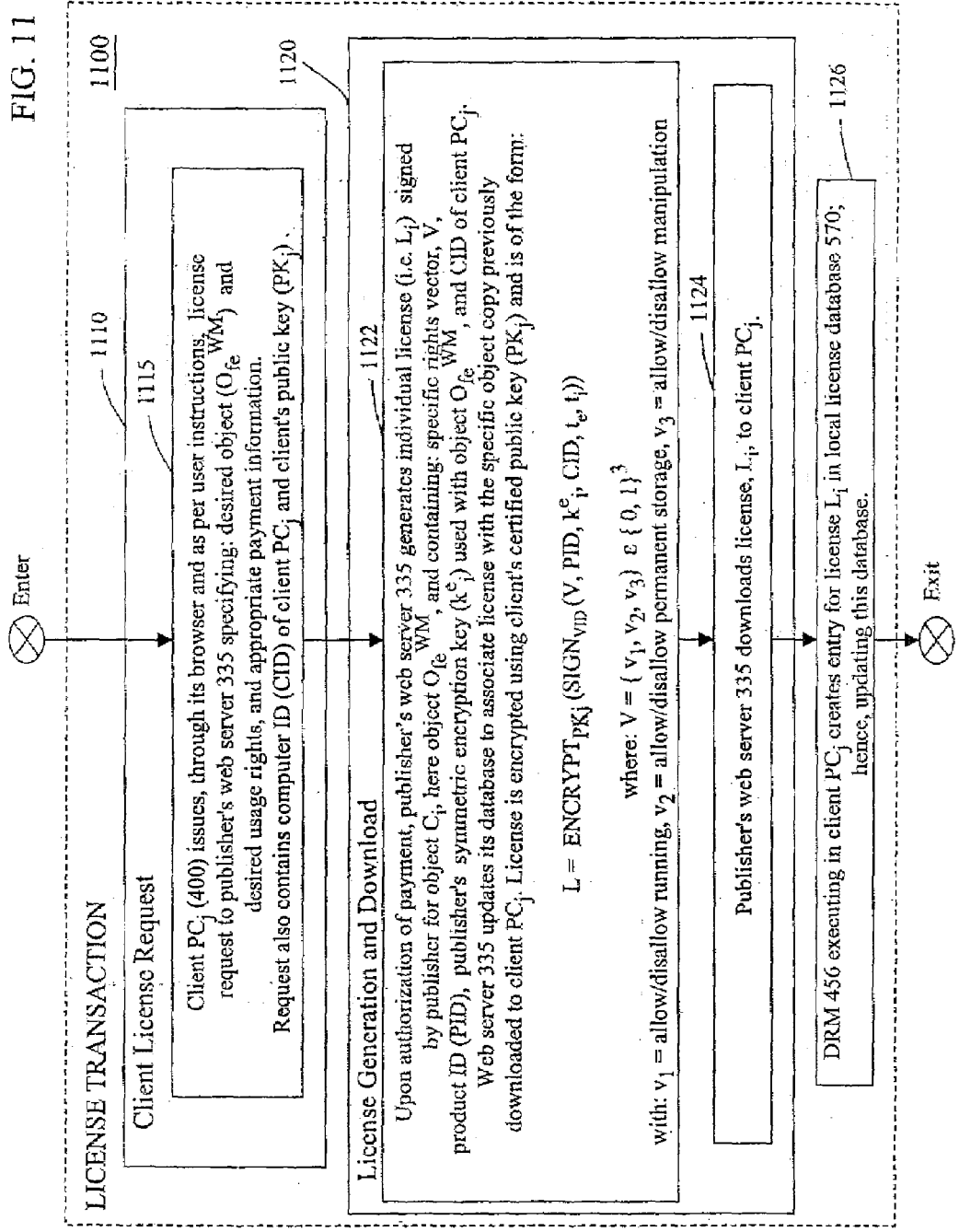
FIG. 11 depicts a flowchart of license transaction operation 1100 that occurs within process 700 shown in FIG. 7.

FIG. 11 depicts a flowchart of license transaction operation 1100 that occurs within process 700 shown in FIG. 7. As noted above, this operation is performed between the client PC and the publisher no effectuate a license transaction. Through this operation, a user stationed at the client PC will submit payment for specific rights to access and use the downloaded object and then, in exchange, receive an electronic license from the publisher that conveys certain rights to the client PC for appropriately accessing and using that object. This operation is performed each time a user stationed at a client PC desires to obtain a license to use a protected object.

In particular and as shown in FIG. 11, at a start of this operation, the client PC requests a license from a desired publisher by performing client license request operation 1110. Within this operation and as indicated by block 1115, client PCj (400) establishes an Internet session with publisher's web server 335 and issues, through a web browser then executing at that client and as per instructions from the user (typically entered through graphical selection mechanism used in conjunction with a renderer web page downloaded from the publisher's web server 335), a request to obtain a license to access and use a corresponding object (here Ofe$^W$-$_M$)previously downloaded from the publisher. During the course of doing so, the user selects a degree of access and use desired for this object and authorizes an electronic payment to the publisher for a corresponding license fee. The request includes not only the rights desired and payment information—as provided by the user, but also, as provided by the client PC and oblivious to the user, the computer ID (CID) of client PCj and a public key (PK~) associated with that particular PC.

Once this request is transmitted to publisher's web server 335, this web server performs license generation and download operation 1120. Specifically, after having received the request, web server 335 generates, as indicated in block 1122, the license (L for this object (O$_{fe}$$^{WM}$). As stated above, the license, in the form specified in equation (1) above, is signed by the publisher and contains, of which the signature ms a function: the rights vector, V, for this object; the product ID, PID, value embedded in each watermark in the object; the symmetric encryption key, k$^c$i, used to encrypt the object; and the computer ID, CID, of client PCj (i.e., the individual PC to which the license is issued). The license is encrypted using the certified public key, PKj, of client PCj which that PC has provided, as part of its license request, to the publisher.

After the license (Li) is generated by publisher's web server 335, that server updates an entry in its user database for the specific copy of the object that has been downloaded, in terms of its fingerprint and symmetric encryption key, to associate the license, through the CID of client PCj, with this particular copy. Hence, the entry now links a particular copy of the object with a particular client PC on which that copy will be used and accessed, and the specific rights of use and access of the object that have been accorded to that PC. Thereafter, as indicated by block 1124, web server 335 downloads the license to client PCj, after which operation 1120 is complete.

Lastly, in response to receipt of the license at client PCj, DRM system 456 executing at that PC creates, as indicated by block 1126, an entry in license database 570 and stores this license ~n that entry; hence, updating this database to contain a license for downloaded object Of~™. Once this occurs, operation 1100 is complete.

Figure 12:
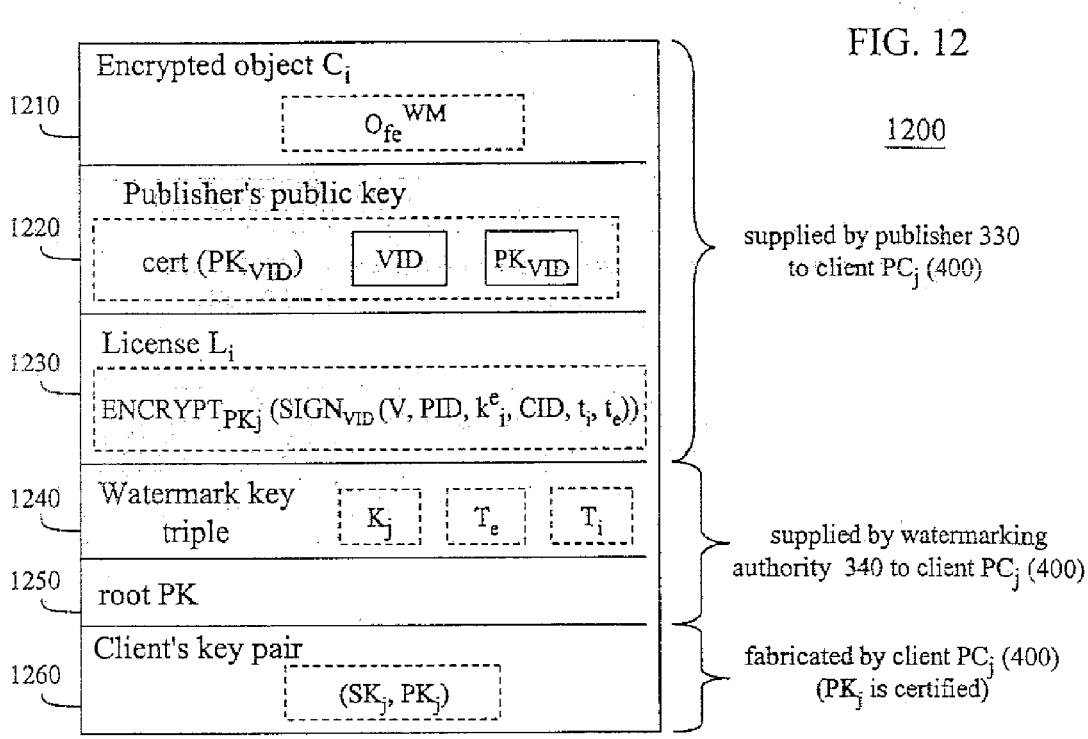
FIG. 12 depicts cryptographic parameters 1200 existing in, e.g., client PCj (400) after a license transaction has been completed through operation 1100 shown in FIG. II, and corresponding sources from which these parameters originate.

As an aid in reader understanding, FIG. 12 depicts cryptographic parameters 1200 existing in client PCj (400) after a license transaction has been completed through operation 1100, and corresponding sources from which these parameters Originate.

As shown, these parameters, denoted by reference numerals 1210, 1220, 1230, 1240~1250 and 1260, are, respectively, as supplied by publisher 330: encrypted object Ci (Oze~); the publisher's public key certificate containing the publisher's certified public key (PKwD) and the vendor ID) (VID) value (i.e., an "expected" VID value); signed license (L±]; and as supplied by watermarking authority 340: watermark key triple (Kj, Ti, Te) and root PK; and client PC public key pair (SI<j, PKj) fabricated by the client PC itself, in which public key, PKj, is certified.

4. License Verification, Ob3ecr Decryption and Enforcement Operations 1300

Figure 13A:
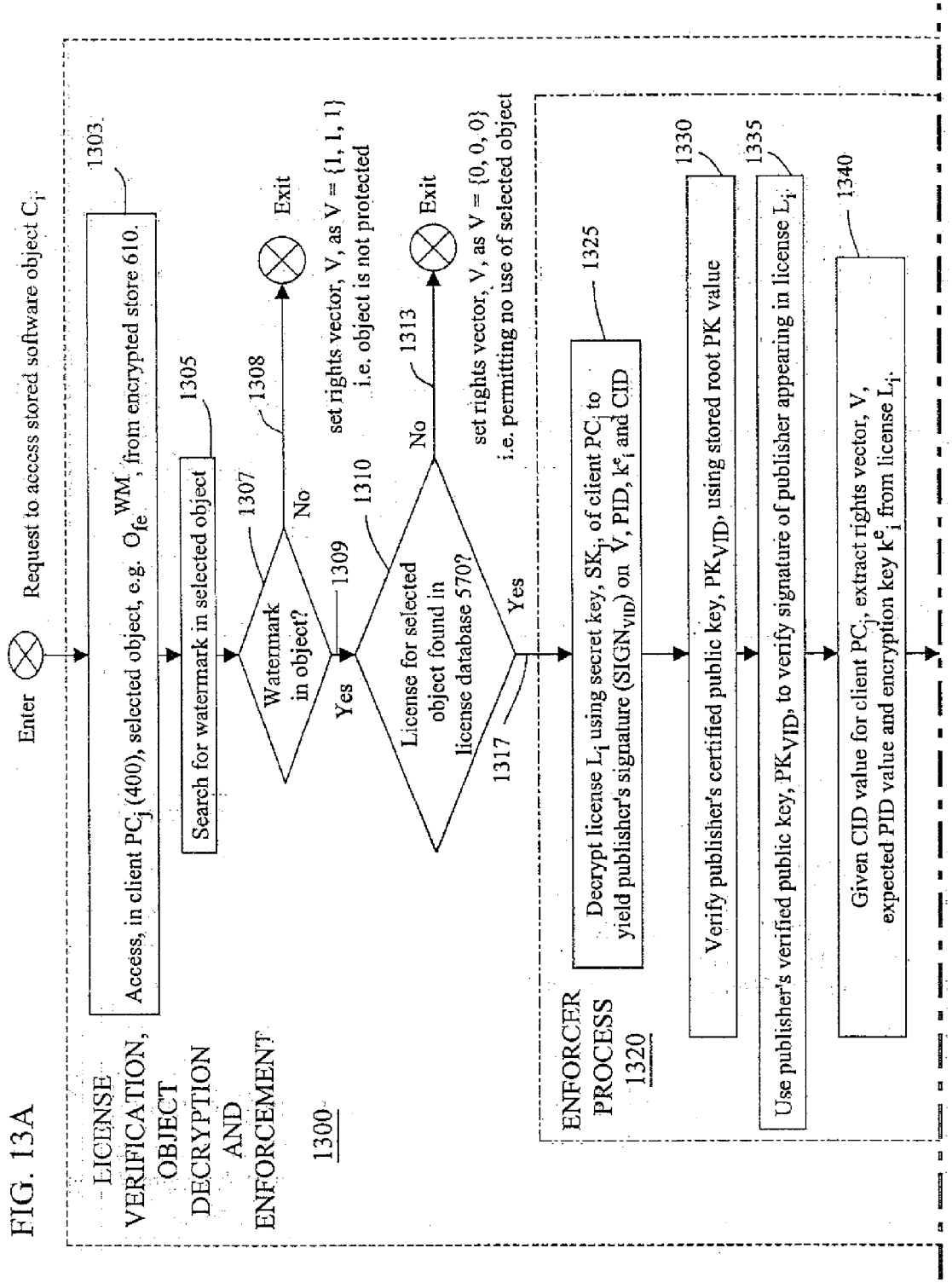
FIGS. 13A and 13B collectively depict a flowchart of license verification, object decryption and enforcement operations 1300 that occur within process 700 shown in FIG. 7.
Figures 13, 13A, 13B:
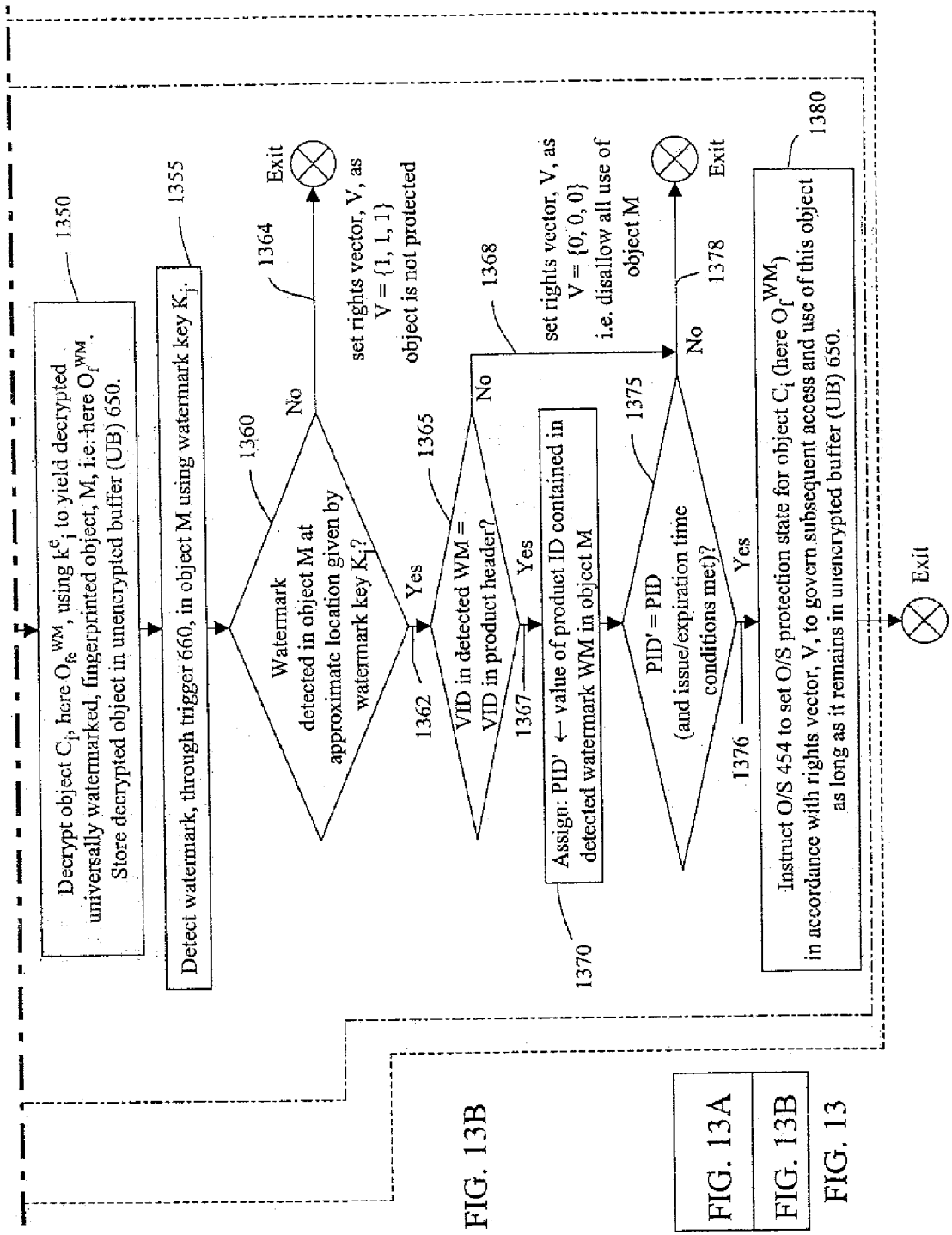
FIG. 13 depicts the correct alignment of the drawing sheets for FIGS. 13A and 13B.

FIGS. 13A and 13B collectively depict a flowchart of license verification, object decryption and enforcement operations 1300; the correct alignment of the drawing sheets for these figures is shown in FIG. 13. As noted above, operations 1300 are performed by client PCj (400) each time that PC requests to access or use a protected and previously downloaded software object. Operations 1300 verify the license for that object; decrypt that object; and enforce whatever restrictions, as specified in the rights contained in the license, exist on the client PC for subsequent access and use of that object.

Upon entry into operations 1300 and in response to a request to access or use a protected and previously downloaded object, the client PC first accesses, as indicated in block 1303, that object, e.g., Ofe™, from encrypted store 610. Once the object is accessed, the object is searched, through execution of block 1305, to detect a watermark in the object. If the object does not contain@watermark, in a location specified by the watermark key (Kj), then, through execution of decision block 1307, the object is assumed unprotected. Hence, operation 1300 terminates, via NO path 1308, with the rights vector being set to, e.g., all ones ("Is"), thus signifying unlimited usage. Otherwise, execution proceeds via YES path 1309 emanating from this decision block. In this case, the client PC determines, through DRM system 456 (see FIG. 4) and specifically through decision block 1310 shown in FIGS. 13A and 13B, whether a license then exists for that object within license database 570. If no such license exists, then the values of all the bits in the rights vector for this object are set to zero, e.g., vector (v1, v2, v3) is set to (0, 0, 0), to inhibit any further access and use of this object. Thereafter, execution exits, via No path 1313 emanating from decision block 1310, from operations 1200. Alternatively, if a license is found for this object, then decision block 1310 routes execution, via Yes path 1317, to enforcer process 1320. Process 1320 is performed by the enforcer (e.g., as shown ~n FIG. 4, enforcers 600 and 600' for active and passive objects, respectively).

Upon entry into process 1320 shown in FIGS. 13A and 13B, block 1325 is first executed to decrypt the license (Li) for this object using the secret key of client PCj in order no yield the publisher's signature. Once this occurs, block 1330 ms performed to conventionally verify the publisher's certified public key (PKvzD) using the root PK value stored within the enforcer. After this certified key has been verified, the enforcer performs block 1335 no conventionally verify the publisher's signature in the license using the publisher's certified public key—Which itself has just been verified. Once this signature has been verified and given the CID value of client PCj, the enforcer then performs block 1340 to extract the rights vector, V, the expected VID value, and the symmetric encryption key, kei, from the license.

Thereafter, the enforcer, as indicated in block 1350, decrypts the downloaded object, fe 7 using the symmetric encryption key (kei) extracted from the license no yield the decrypted, fingerprinted and watermarked object, M (i.e., Of™), which is then snored within unencrypted buffer 650. Once the object is decrypted, the enforcer, through use of watermark detector (trigger) 660 (see FIG. 6) r performs block 1355, as shown in FIGS. 13A and 13B, no detect watermark in this object located an, e.g., a starting location given by single watermark key Kj snored within the enforcer. Thereafter, decision block 1360 executes no determine whether a watermark was found at this location or not.

If a watermark was not found, then the object is assumed to be non-protected. As such, the client PC is afforded unrestrained access to and use of the object. Consequently, the values of all the bits in the rights vector for this object are set to one, e.g., vector (v1, v2, v3) is set to (i, I, I), after which execution exits, via No path 1364 emanating from decision block 1360, from operations 1300.

Alternatively, if a watermark is found in the object an, c.~., a starting location specified by watermark key Kj, decision block 1360 routes execution, via Yes path 1362, to block 1365. This later decision block determines whether the expected vendor ID value, as previously provided in the object file header (here header 1010 shown in FIG. 10) exactly matches the VIE) value contained in the license, Li, provided for this object. Importantly, the license must be signed by the vendor whose VIE was found in the watermark. If these values do not match~ then all the bits in the rights vector for this object are set to zero, e.g., vector (v~, v2, vs) is set to (0, 0, 0), to inhibit any further access and use of this object, after which execution exits, via No paths 1368 and 1378 emanating from decision block 1370, from operations 1300. Alternatively, if these values match, then decision block 1365 routes execution, via Yes path 1367, ~o block 1370. This latter block, when performed by the enforcer, sets variable PID) equal to an actual value of the product ID contained in the watermark that has just been detected in the object. Thereafter, the enforcer determines, through decision block 1375 whether the actual value of the PID found in the watermark identically matches the expected value of the PID specified in the license. If a mis-match occurs, then all the bits in the rights vector for this object are set to zero, e.g., vector (v1, v2, v3) is se~ to (0, 0, 0), to inhibit any further access and use of this object, after which execution exits, via No path 1378 emanating from decision block 1370, from operations 1300. In addition, decision block 1350, if license and key issue and expiration times are used, determines whether license LI was issued later than watermark key and expires before this watermark key does. If either of these conditions is not satisfied, execution also exits, via NO path 1378, with right vector V sec to disallow all use of object M. Alternatively, if these PID values match (and, when used, both of the issue/expiration time conditions are met), then decision block 1375 routes execution, via Yes path 1376, to block 1380. This latter block, when performed by the enforcer, instructs client O/S 454 co set an O/S protection state for this object, M (i.e., here Of~), in accordance with the rights vector, V, specified in the license. As such, the O/S, and specifically DRM system 456 therein (see FIG. 6), will subsequently access and use this object, as long as its decrypted form remains in unencrypted buffer 650, strictly &n accordance with the rights specified in the rights vector. Once this protection state is set, process 1320 completes as do operations 1300.

5. Object Usage Operation 1400

FIG. 14 depicts a flowchart of object usage operation 1400 that occurs within process 700 shown in FIG. 7. As noted above, this operation occurs to permit the downloaded (fingerprinted and watermarked) object, now decrypted and residing in unencrypted buffer 650 (see FIG. 6) to be used, as requested by the client PC, but only to an extent consistent with the rights specified in the license for this object.

Upon entry into operation 1400 as shown in FIG. 14, client PC~ (400) accesses and uses, as depicted in block 1450, the decrypted object (M) as specified in a user request (UR) consistent with and limited by the licensed rights specified in the rights vector (V). In that regard, illustratively assume UR can be set to any one the three values, UR s {1,2,3}, where a value indicates a user request to ran (execute or play) the object; a value "2" indicates a user request to snore the encrypted version of the object, i.e., maintain that version of the object within encrypted store 610 (see FIGS. 4-6); and a value "3" indicates a user request modify the unencrypted version of the object. Hence, access and use will be governed by the following pseudo-code:

If (UR=2 AND v2=1), THEN allow the encrypted object to reside within encrypted store 610; If (UR=3 AND v3=1), THEN allow the unencrypted version of the object to be modified; or If (UR=1 AND v1=1), THEN If (v3=0) check publisher's signature on object M and allow object to be executed.

Once the unencrypted object was so used, block 1450 would complete, as would operation 1400. To the extent the rights vector permits repeated use of the object, operation 1400 would be re-executed each successive time client PCj attempts to access and use this object.

6. Client Watermark Key Assignment

FIG. 15 depicts a flowchart of client watermark key assignment process 1500 as used in conjunction with our present invention. This process, involving both the client PC and the watermark authority, can be used to supply that client with a watermarking key, K. This process would be used if, for whatever reason, the enforcer, e.g., enforcer 600 or 600', situated in, e.g., client PC~ did not possess a watermark key, e.g., Kjr or due to a leak of this key from another client that used the same watermark key.

In particular, to obtain a watermark key, client PCj would first establish~ secure Internet session with server 345 situated at watermarking authority 340. Once this session was established, the client PC, as symbolized by line 1505, would provide the server with the certified public key (PKj) of the client and the computer ID (CID) of the client, and then issue a request to that server for a watermark key, Kj. In response to this request, server 345, as indicated in block 1510, would select, typically randomly, particularly for providing a new watermark key, one watermark key, Kj li.e., one key out of the n universal watermark keys previously created by the WA through prior execution of block 810 shown in FIG. 8) for use by this particular client PC. Thereafter, the server, as indicated ~n block 1520 shown in FIG. 15, would establish a new entry in a watermark key database (non specifically~.shown) that associates client PCj, in terms of its CID, with watermark key Kj. Once this entry is created and stored, WA server 345 would encrypt the watermark key, as indicated in block 1530, using the certified public key of client PC~ and download, as symbolized by line 1535, a resulting encrypted watermarked key no this client PC. Upon receipt of the encrypted key, client $PC_3$, using its secret key (SKi) r would then decrypt the encrypted watermark key and thereafter snore a resulting plaintext watermark key, Kj, and the key certificate within key manager 640 located in enforcer 600 (or 600'). The key appears as a triple (Zj, Ti, Te), where K] is the key itself, T± is the issue time and Te is expiration time. Once this occurs, client PC~, specifically its client O/S, would set an appropriate software status switch (flag) to an "initialized" state such that the client PC can then process protected objects. As previously noted, the client PC in the absence of receiving a watermark key is unable (by virtue of this flag non having been initialized) to subsequently process any object. Key manager 640 stores the watermark key in a secured manner inaccessible to the owner and user of the client PC.

7. New Watermark Key Provisioning

FIG. 16 depicts a flowchart of new watermark key provisioning process 1600 as used on conjunction with our present invention co provide a new watermark key to a client PC. This process, also involving both the client PC and the watermark authority, would be used to supply that PC with a new watermark key. This process could be invoked manually by a user in response to an alert (or prompt) generated by the enforcer, shortly before the watermark key expires (such as, e.~., 1-2 months before expiration), and reported to the DRM system which, in turn, causes the client O/S to display that alert to the user. This process can also be invoked automatically by the key manager located within the enforcer in the client PC, shortly before a watermark key then existing on that enforcer will expire. As noted above, watermark keys periodically expire, such as, e.~., every few months ~o a year or two, and thus need to be regularly replaced. Alternatively, the watermarking authority could contact the client PC, such as through e-mail, and request that client subsequently contact the watermarking authority to obtain a new watermark key, and, by doing so, invoke process 1600.

In particular, to obtain a new watermark key, client PCj establishes, as symbolized by line 1605 and using an existing certificate for the public key of this client PC, a secure Internet session with server 345 situated at watermarking authority 340. Once this session was established, server 345, through execution of decision block 1610, determines, through accessing its user database, whether the certificate for the public key for client PCj has been revoked. If this certificate has previously been revoked by the certifying authority (which here, for simplicity is assumed to be the watermarking authority)—which could occur under the same conditions a watermark key was revoked (i.e., detected piratical activities involving this client PC), the WA will nor supply that client with any new keys, thereby denying that client any access=o future watermarked objects—provided the issue/expiration time interval of the license for each of these objects would be within that of the new revoked watermark key. In this instance, process 1600 aborts with execution exiting, via Yes path 1613 emanating from decision block 1610.

Alternatively, if the existing client public key certificate is valid, execution proceeds, via No path 1617 emanating from decision block 1610, to decision block 1620. This latter decision block, when executed, determines whether the watermark key, Kj, then being used by client PCj has itself been revoked. A watermark key can be revoked because of illicit behavior of another client PC which shares the same watermark key. In that instance, the certificate of the latter client will be revoked. Other clients which share this key will obtain a new watermark key; the existing watermark key will not be revoked as to those clients. In this instance, if the watermark key has been revoked, process 1600 aborts with execution exiting, via Yes path 1623 emanating from decision block 1620.

If, however, the existing watermark key for client PC~ has non been revoked, then decision block 1620 routes execution, via No path 1627 emanating from this decision block, to block 1640. Server 345, through execution of block 1640, selects, typically randomly, a new watermark key, Kj' (i.e., a different key out of the n universal watermark keys previously created by the WA through execution of block 810 shown in FIG. 8) as the watermark key for client PC], i.e., as key Kj, Once this new watermark key has been selected, server 345 sends, through execution of block 1650, shown in FIG. 16, and as symbolized by line 1660, the new watermark key along with, if a watermark key triple is being used, its associated issue and expiration times (Ti and T~, respectively) no the client PC. Client PC], in turn, and specifically key manager 640 executing therein substitutes the new public key certificate and the new watermark key (key triple, where used) in enforcer 600 (or 600') for the corresponding pre-existing items.

Illustrative techniques for embedding watermarks in objects

We will now discuss two illustrative techniques which can be used no embed, and, specifically, in this context, hide, a watermark in passive and active software objects.

a. Passive Objects

To provide sufficient robustness against adversarial tampering or corruption, individual watermark bits should preferably be spatially spread across a considerably larger number of bits in the object, e.g., starting at a location specified by a corresponding one of the secret watermark keys.

In the context of a graphical object, such as a movie or video recording, which is organized into pre-defined blocks of data, such as frames, wherein each such block contains a relatively large number of data bits, a small number, such as one or more, individual bits of a watermark can be readily hidden in each such block. In this case and as illustratively shown in FIG. 17 and described above, ~single watermark bit can be readily hidden, with sufficient robustness, within a frame of a digitized movie or video recording.

In essence, a single bit could be spread, using conventional spatial spreading techniques] over a considerable number, m (where m is a length of a spread sequence), of pixels in a common frame. To do so, values of a succession of m pixels could be varied by a secret predefined pseudo-random marking sequence of "marks" with each mark being a change, either by subtraction or addition, of a gray level in a corresponding pixel. Hence, each of the m successive pixels would have its gray level intentionally varied, either up or down by a single gray level, as dictated by a corresponding mark in the sequence. The specific marking sequence in use is known both to the applicable enforcer and whatever organization, e.g., a watermarking authority, that embeds the watermark on an object.

To detect a watermark bit, a trigger (e.g., a watermark detector situated in enforcer 600', shown in FIG. 6, located in a media card) would form a dot product of the m pixel values and the pseudo-random marking sequence (i.e., a particular value of a mark in the marking sequence multiplied by an actually detected value of a corresponding one of the m pixel values in the object) and then sum all resulting products. Given the pseudo-random nature of the marking sequence, the unmodified pixel values ("payload values") will approximately cancel out, thus leaving a positive or negative sum of squares of 3us~ the variations, i.e., marks. Presence of a single "I" bit in a watermark would be indicated by a relatively large positive sum, ire., approximately equal to the value of m. If a watermark bit were to be embedded, the same process would be used; however, the marks (gray scale variations) in the pseudo-random marking sequence would be reversed (−I would be used for +I one~ and vice versa), thereby resulting in a large negative sum of squares, approximately equal to a value of −m. Moreover, rather than just embedding a single watermark bit just once in a common frame of data, to provide enhanced robustness, the same bit can be embedded multiple times in that frame or even extending, multiple times, over several frames—regardless of whether those frames are successive or not.

Since the watermark key would need to point to one pixel, as, e.g., a starting location, in a substantially large object, such as a movie, the watermark key would need to contain a considerably larger address than that afforded by, e.g., a 20-bit watermark value. Hence) the watermark key could serve as a ~seed", which, through conventional deterministic calculations (watermark key values, as noted above, are themselves pseudo-random numbers generated through use of a random number ~seed"), can be used to generate an appropriately long pixel address (either on a physical location or temporal (playing time) basis given an address space inherent in the object. In this regard and for further details, see, e.g., section 5.3, pages 173~175 entitled "Pseudorandom bit generation" of A. J. Menezes, Handbook of Applied Cryptography© 1997, CRC Press), which is incorporated by reference herein. The watermark key could also contain information specifying whether a single watermark bit is encoded through multiple sequences of pixels and their separation, in terms of spreading distances, and, if multiple frames are involved, an identification of those frames, such as through, e.g., frame numbers or inter-frame spread distances or other suitable indicia.

The number of marks (i.e., length of the marking sequence) that should be used in any instance, for a given level of robustness, is readily determinable through conventional and well-known communication theory. Moreover, a sufficient number of marks could be used such that efficient uniform adversarial jamming would noticeably degrade quality of the payload data, hence diminishing commercial attractiveness of and demand for a resulting "jammed" version of a protected passive object.

Now, with specific reference to FIG. 18, this figure depmcrs three successive illustrative pixels 1810, 1820 and 1830 having payload (non-modified) multi-bit values of a0, a1 and a~, respectively. An illustrative pseudo-random marking sequence containing values of +i, −I and −I corresponding to these three pixels varies the multi-biz values for these pixels by adding, subtracting and subtracting, respectively, one gray level from these pixel values, thereby yielding corresponding pixel values a0+1, a1−i and a2−1 which are stored, in lieu of values a0, a1 and a2, within a protected graphical ob3ect. This process ms repeated for those successive pixel values that are to remaining marks for the present watermark and all marks for each and every other watermark that is to be embedded in that object.

b. Active Objects

Active (executable) objects, i.e., payload code, can be robustly watermarked through, e.g., use of execution graph inseparability. Here, watermark keys would nor necessarily point no a location in a protected program at which a watermark is located but rather would be supplied by enforcer 600 (see FIG. 6) during initial execution of the program and would then be used to compute, through embedded "watermark code", a corresponding watermark value. If the computed watermark value failed to match a watermark value provided in an associated license for the protected program, the enforcer would instruct the client O/S to immediately terminate further execution of that program.

In essence, a rather small executable program (i.e., the watermark code) computes a watermark value, here VID given a corresponding watermark key (Ki). In that regard and as an illustrative technique, let: f1 be a one way function; f2 be a symmetric encryption function; u1, . . . , un be watermark variable names; K1, -., Kn be the n secret watermark keys; and such that: for all i, ui=f1 (Ki); and with the value of ui being vi, f;(Ki,vi)=VID. Hence, the watermark code, given the watermark key (Ki), would compute the VID value.

The watermark code is repeatedly spliced and tightly integrated into a control flow of a payload program ("payload code") such that the former program becomes extremely difficult, if nor for all practical purposes impossible, to separate from the latter program.

Specifically, non-watermarked payload code and the watermark code would each be applied to a conventional program analysis tool (not shown). This tool generates corresponding digitized flow graph representations for the payload code and the watermark code. Nodes are then selected in the flow graph of the payload program, typically on a random or pseudo-random basis. Two edges (out-going and return) are then inserted between each such node in order to insert a copy of the watermark code into the execution flow of the payload code: the out-going edge directs execution from the payload code to the watermark code, while the return edge returns execution from the watermark code back to the payload code; thus, yielding a combined flow graph for the watermarked payload code. Thereafter, the resulting executable version of the watermarked payload code is conventionally assembled from the combined flow graph. Since the flow pattern of the watermark code is repeatedly and highly intertwined with (tightly spliced into) the flow pattern of the non-marked payload code, the watermarks are practically impossible to either remove from the watermarked payload code and/or circumvent. Furthermore, watermark code is preferably added in such a manner that the flow pattern of resulting watermark code is not substantially different from that of the non-marked payload code such that the watermark code is also extremely difficult for the third party adversary to discern using, e.g., standard flow analysis tools.

All the copies of the inserted watermark code can be scattered on uniform, random or pseudo-random basis throughout the watermarked payload code. In this manner, the watermark code instances will not be centralized in any one portion of the watermarked object.

Furthermore, each of these instances is written with conventional standard code "obfuscation" techniques to further camouflage their functionality.

Now, with specific reference to FIG. 19, this figure depicts illustrative BORE-resistant software object 1900 containing payload code 1910. This code, here represented as an illustrative execution flow graph includes execution blocks 1911, 1913, 1915, 1918 and 1919 (among others nor shown). Code 1930 contains illustrative watermark code instances 19301 and 19302 (also among others, specifically all totaling n such instances, not shown to simplify the drawing)~ each having an associated execution flow graph. Edges 1920 and 1940 have been added into the flow graph for payload code 1910 in order to break flow path 1912 and splice watermark code 19301 therein, with out-going edge 1920 directing execution flow from block 1911 in payload code 1910 to watermark code 1930~' and return edge 1940 returning execution flow from watermark code 19301 back to payload code 1910 and specifically to next successive block 1913 therein. Edges 1950 and 1960 have been added into the flow graph for payload code 1910 in order to break flow path 1916 and splice watermark code 19302 <herein, with out-going edge 1950 directing execution flow from block 1915 in payload code 1910 to watermark code 19302 and return edge 1960 returning execution flow from watermark code 19301 back to payload code 1910 and specifically to next successive block 1918 therein.

As one can now clearly appreciate, we have described our invention in the context of providing a substantial degree of BORE-resistance to software objects and hence security against piracy of those objects through using multiple watermark keys to point, in some fashion, e.g., spatially or temporally, to specific corresponding watermarks embedded in a protected Object. If far less security is required in a given application such as where a license fee will not be charged, we can appreciably relax the requirements of watermarks and associated licenses we employ—even to a point of eliminating license altogether. For example, for those objects not likely to be pirated or where piracy is not a major concern to a publisher, a watermark could just contain either a single bit value that specifies whether an object carrying that watermark can be copied or nor, or a few more bits that collectively provide specific access and usage rights to that object the enforcer would simply detect the watermark value and pass that value to a DRM system which, in turn, would set a client O/'S protection state for that object in accordance with this value. Through this scenario, all users of the object would have the same rights to access and use the object. Hence, a license would not be needed and could be eliminated. Furthermore, the Object would non be encrypted or fingerprinted. Alternatively, to provide enhanced security for certain other applications, the object could be encrypted, such as through use of a symmetric encryption key, and a "basic" license, though not linked to any watermark, employed to supply that key to each requested user. Clearly, those skilled in the art readily recognize that the contents of a license, the manner in which the license is used, the contents of the embedded watermarks and the manner through which the watermarks are used, either in conjunction with or in the absence of a license, in controlling access and use can all be varied widely, from a highly secure implementation (such as that described in detail above in the context of FIGS. B-19} to one that provides much a lower level of security against piracy, in order to suit the security needs of any particular application that disseminates software objects whether passive or active, to requesting users.

Additionally, we have described all n watermarks embedded in a common software object as being identical~ i.e., possessing the same value. However, the watermark values need not be so limited and, in fact, can differ among the n watermarks embedded in the common software object. In that regard, all, some or none of these watermarks can share a common value. While use of such differing values will provide an additional measure of security against adversarial attacks, doing so will increase processing complexity at the publisher (or vendor) in order to associate~particular watermark value with a given watermark key and provide the proper watermark value (WM) with a given license. Moreover, if need be, watermark values can vary across different objects as well—though this too will also increase processing complexity, in order to properly account for the watermark keys, not only at a publisher (or vendor) but also at the watermarking authority.

Furthermore, although we have described the publisher, and specifically its web server 935, as downloading both the encrypted, fingerprinted and watermarked software object (Ofe™) and the license, each of these items can be supplied through different servers and by different entities. This can easily arise where the object may be published by one entity, but distributed by several others, the lazier being vendors distinct from the publisher. For example~ while each vendor may separately provide the object for download, the publisher may require that a user can only obtain a license to access and use the object from the publisher, and thus needs <o establish a network session with the publisher's web server to do so. In a segregated vendor-publisher scenario, both the vendor which downloads the object to a requesting user as well as the publisher which downloads a license to that user should have access ~o a common user database in order ~o create and update user entries, in response to user download activity, that properly associate individual copies of each downloaded software object width the individual client PC to which that copy is downloaded and then licensed. Moreover, the watermarking authority could be eliminated in favor of publisher 330, specifically its web server 335—as noted above, or by a vendor and its web server, to the extent the publisher and vendor[s) are separate entities.

In addition, while the license transaction is described as preferably occurring over a networked connection between a client PC and a vendor or publisher (to the extent the latter two are different), this transaction san occur in a non-networked environment as well. In this case, diskettes, whether magnetic or optical, or other removable and transportable media could be used to transport and distribute a watermarked software object from a content provider (publisher or vendor) to requesting users. Any such User can then transact, such as through a telephone, with that publisher or vendor to obtain a license provided on, e.g., the same (or different) type of media which is then sent to that user through postal mail or other physical delivery mechanism. Furthermore, to the extent ~he content provider supplies the object on a given physical media, such as on a particular diskette, CD-ROM or other medium, that provider could also store the associated license (or licenses, each with different rights to access and use the object) on the very same physical media as that which stores the object and send that particular media to the user for insertion into a suitable player connected either to his(her) PC or other equipment which contains an appropriate digital rights management system consistent in operation with that described above. In exchange for receiving, payment for the license, the provider will issue a suitable key, or other parameter through which the PC can then read the license (oz a specific one of a number of licenses, corresponding to an amount of the payment made to the provider.

Although an embodiment, with various extensions and modifications, which incorporates the teachings of the present invention has been shown and described in considerable detail herein, those skilled in the arc can readily devise many other embodiments, modifications and applications of the present invention that still utilize these teachings.

What is claimed is:

1. A computer-readable medium having computer-executable instructions for performing steps comprising:
   utilizing an enforcer contained within a digital rights management system, for controlling use of watermarked software objects, wherein the enforcer stores a predefined watermark key which defines a specific one of a plurality of identical watermarks embedded in the watermarked software object with different watermark keys to be used by the enforcer in subsequently controlling use of each one of said watermarked software objects, and wherein the predefined watermark key expires after a predefined period of time elapses since said predefined watermark key was initially stored in the enforcer;
   establishing a network connection to a server if the predefined watermark key is not possessed;
   issuing a request to the server for a new watermark key;
   storing the watermark key received from the server for subsequent use in controlling access to watermarked software objects;
   selecting one of a predefined plurality of predetermined watermark keys for use in controlling access to the software watermarked objects as the watermark key; and
   downloading the watermark key to the client computer.

2. The computer readable medium of claim 1 having further computer instructions for connecting to a secure connection.

3. The computer readable medium of claim 2 having further computer instructions for associating the server with a publisher of any one of the watermarked software objects or a vendor of said one object, or a watermarking authority.

4. The computer readable medium of claim 1 having further computer instructions for encrypting the watermark key using the public key of the client computer so as to yield the encrypted key; downloading the encrypted key to the client computer as the watermark key upon receipt of the watermark key; decrypting the encrypted key using a private key associated with the client computer so as to yield a decrypted key; and storing the decrypted key as the watermark key.

5. The computer readable medium of claim 4 having further computer instructions for connecting to a secure connection.

6. The computer readable medium of claim 5 having further computer instructions for associating the server with a publisher of any one of the watermarked software objects or a vendor of said one object, or a watermarking authority.

7. A digital rights management system comprising:
   a processor means;
   a means for enforcing digital rights management of watermarked software objects utilizing an enforcer executed on the processor, wherein the enforcer stores a predefined watermark key which defines a specific one of a plurality of identical watermarks embedded in the watermarked software object with different watermark keys to be used by the enforcer in subsequently controlling use of each one of said watermarked software objects, and wherein the predefined watermark key expires after a predefined period of time elapses since said predefined watermark key was initially stored in the enforcer;
   a means for establishing a network connection to a server if the predefined watermark key is not possessed;
   a means for issuing a request to the server for a new watermark key;
   a means for storing the watermark key received from the server for subsequent use in controlling access to watermarked software objects;
   a means for selecting one of a predefined plurality of predetermined watermark keys for use in controlling access to the software watermarked objects as the watermark key; and
   a means for downloading the watermark key to the client computer.

8. The digital rights management system of claim 7 further comprising a means for connecting to a secure connection.

9. The digital rights management system of claim 8 further comprising a means for associating the server with a publisher of any one of the watermarked software objects or a vendor of said one object, or a watermarking authority.

10. The digital rights management system of claim 7 further comprising a means for encrypting the watermark key using the public key of the client computer so as to yield the encrypted key; downloading the encrypted key to the client computer as the watermark key upon receipt of the watermark key; a means for decrypting the encrypted key using a private key associated with the client computer so as to yield a decrypted key; and a means for storing the decrypted key as the watermark key.

11. The digital rights management system of claim 10 further comprising a means for connecting to a secure connection.

12. The digital rights management system of claim 11 further comprising a means for associating the server with a publisher of any one of the watermarked software objects or a vendor of said one object, or a watermarking authority.

* * * * *